United States Patent
Reddy

(10) Patent No.: US 10,858,565 B2
(45) Date of Patent: Dec. 8, 2020

(54) GAS GENERATING COMPOSITIONS

(71) Applicant: Saudi Arabian Oil Company, Dhahran (SA)

(72) Inventor: B. Raghava Reddy, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/282,245

(22) Filed: Feb. 21, 2019

(65) Prior Publication Data

US 2020/0270502 A1    Aug. 27, 2020

(51) Int. Cl.
| | |
|---|---|
| *C09K 8/38* | (2006.01) |
| *C09K 8/035* | (2006.01) |
| *C09K 8/42* | (2006.01) |
| *C09K 8/62* | (2006.01) |
| *C09K 8/60* | (2006.01) |

(52) U.S. Cl.
CPC ............... *C09K 8/035* (2013.01); *C09K 8/42* (2013.01); *C09K 8/60* (2013.01); *C09K 8/62* (2013.01)

(58) Field of Classification Search
CPC .......... C09K 8/035; C09K 8/42; C09K 8/473; C09K 8/518; C09K 8/70; C09K 8/703; C09K 8/94
See application file for complete search history.

(56) References Cited

U.S. PATENT DOCUMENTS

| | | |
|---|---|---|
| 3,933,495 A | 1/1976 | Kondo et al. |
| 4,145,495 A | 3/1979 | Robinson et al. |
| 4,741,844 A | 5/1988 | Posey, Jr. |
| 6,715,553 B2 | 2/2004 | Reddy et al. |
| 6,722,434 B2 | 4/2004 | Reddy et al. |
| 6,858,566 B1 | 2/2005 | Reddy et al. |
| 6,992,048 B2 | 1/2006 | Reddy et al. |
| 7,156,175 B2 | 1/2007 | Reddy et al. |
| 10,150,905 B1 | 12/2018 | Reddy |
| 2003/0220204 A1 | 11/2003 | Baran et al. |
| 2003/0221832 A1* | 12/2003 | Reddy ............. C09K 8/38 166/300 |
| 2005/0222282 A1 | 6/2005 | Nyssen |
| 2006/0084580 A1 | 4/2006 | Santra et al. |
| 2008/0039347 A1 | 2/2008 | Welton et al. |
| 2009/0048126 A1 | 2/2009 | Phatak et al. |
| 2012/0175118 A1 | 7/2012 | Khatri et al. |
| 2014/0364343 A1 | 12/2014 | Nelson et al. |

FOREIGN PATENT DOCUMENTS

| | | |
|---|---|---|
| EP | 2933307 A1 | 10/2015 |
| WO | WO03102107 A1 | 11/2003 |
| WO | WO03102361 A1 | 11/2003 |
| WO | WO2005085586 A1 | 9/2005 |
| WO | WO2016068850 | 5/2016 |
| WO | WO2017018996 A1 | 2/2017 |

OTHER PUBLICATIONS

Printout of web page https://www.dictionary.com/browse/storing, retrieved Feb. 10, 2020 (Year: 2020).*
International Search Report and Written Opinion issued in International Application No. PCT/US2020/019181 dated May 29, 2020, 13 pages.
PCT Invitation to Pay Additional Fees and, Where Application, Protest Fee issued in International Application No. PCT/US2020/019182 dated Jun. 8, 2020, 13 pages.

* cited by examiner

*Primary Examiner* — Aiqun Li
(74) *Attorney, Agent, or Firm* — Fish & Richardson P.C.

(57) ABSTRACT

The present application provides a gas-generating aqueous fluid containing a gas-generating compound like an azo compound, and an organic amine like a primary, secondary or tertiary amine, a hydrazine, a hydrazide, or a semicarbazide. The aqueous fluid may also a viscosifier, and a foaming surfactant. The present application also provides a method of using the gas-generating composition to modulate density of a wellbore fluid for use in downhole applications. The method optionally includes adding an oxidizer to the wellbore fluid.

18 Claims, No Drawings

GAS GENERATING COMPOSITIONS

TECHNICAL FIELD

This disclosure relates to aqueous fluids containing a gas-generating compound that may be used in wellbore applications.

BACKGROUND

Recoverable fluids, such as hydrocarbons (for example, petroleum, natural gas, combinations of them) and water, are frequently found in subterranean formations. Production of a recoverable fluid from a subterranean formation often requires drilling onto the subterranean formation to produce a wellbore through which the recoverable fluid is brought to the surface. Wellbore fluids such as drilling fluids, carrier fluids, fracturing fluids, spotting fluids, cementing fluids, completion fluids, stimulation fluids, remedial fluids and clean-up fluids are used in the wellbore to perform multiple functions, such as preventing the fluid influx from formation into the wellbore, removing drill cuttings and debris from the wellbore, perforating the casing, primary cementing, fracturing of the subterranean formation for increased recoverable fluid production, cleaning wellbore surfaces, sealing fractures and microannuli within and around the cement sheath, consolidating incompetent subterranean formations, and the like.

SUMMARY

Use of a conventional wellbore fluid having constant viscosity and density may lead to certain disadvantages. In one example, sudden changes in formation type and formation strength may lead to varying fracture gradients leading to loss of circulation. In another example, when residual drilling fluid is left behind casing in a completed well, the casing may be susceptible to collapse from sustained casing pressure (SCP) or annular pressure buildup (APB) due to the fluid expansion behind casing. Also, use of a conventional cementing fluid may lead to poor compressibility of set cement to sustain cyclic stresses, poor cement-to-casing bond, and to formation of microannuli. Therefore, issues associated with the wellbore fluids can reduce well productivity and increase well maintenance costs.

In some embodiments, the present disclosure provides an aqueous gas-generating composition containing a gas-generating compound (for example, an azo compound or an organic amine compound). In one example, the composition may be prepared ahead of a wellbore operation. The composition can be stored until the time it is needed. In another example, the composition may be prepared immediately before the wellbore application. A liquid injection pump can be utilized to inject the gas-generating composition into a wellbore treatment on-the-fly in a continuous operation. Alternatively, the gas-generating composition can be batch mixed into a wellbore fluid. The composition can then be activated, for example, by adjusting pH of the wellbore fluid, adding an oxidizer immediately before pumping the fluid downhole, or both.

In some embodiments, the present disclosure provides a gas-generating aqueous composition comprising an azo compound of Formula (I):

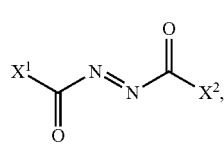

or a salt thereof, where:
X$^1$ and X$^2$ are each independently selected from C$_{1-6}$ alkyl, C$_{2-6}$ alkenyl, C$_{2-6}$ alkynyl, OR$^{a1}$, and NR$^{c1}$R$^{d1}$;
each R$^{a1}$, R$^{c1}$, and R$^{d1}$ is independently selected from H, C$_{1-6}$ alkyl, C$_{2-6}$ alkenyl, C$_{2-6}$ alkynyl, C$_{3-7}$ cycloalkyl, and C$_{6-10}$ aryl; and
an organic amine.

In some embodiments of the compound of Formula (I):
X$^1$ and X$^2$ are each independently selected from OR$^{a1}$ and NR$^{c1}$R$^{d1}$; and
each R$^{a1}$, R$^{c1}$ and R$^{d1}$ is independently selected from H and C$_{1-6}$ alkyl.

In some embodiments, the azo compound is azodicarbonamide:

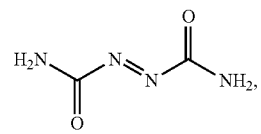

or a salt thereof.

In some embodiments, an amount of the azo compound in the aqueous composition is from about 1 wt. % to about 10 wt. %.

In some embodiments, the organic amine is a primary, secondary or tertiary amine of Formula (IVa):

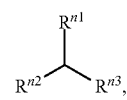

or a salt thereof, where:
R$^{n1}$, R$^{n2}$ and R$^{n3}$ are independently selected from H, C$_{1-6}$ alkyl, C$_{3-7}$ cycloalkyl, and 4-7 membered heterocycloalkyl, each of which is optionally substituted with 1, 2, or 3 substituents independently selected from hydroxyl, C$_{1-6}$ alkoxy, amino, C$_{1-6}$ alkylamino, di(C$_{1-6}$ alkyl)amino, carboxy, and carbamyl; or
any two R$^{n1}$ and R$^{n2}$, or any two R$^{n2}$ and R$^{n3}$, or any two R$^{n1}$ and R$^{n3}$ together with the N atom to which they are attached form a 4-7 membered heterocycloalkyl, which is optionally substituted with 1, 2, 3, 4, or 5 substituents independently selected from C$_{1-6}$ alkyl, NH$_2$—C$_{1-6}$ alkylene, OH—C$_{1-6}$ alkylene, hydroxyl, C$_{1-6}$ alkoxy, amino, C$_{1-6}$ alkylamino, di(C$_{1-6}$ alkyl)amino, carboxy, and carbamyl.

In some embodiments of the amine compound of Formula (IVa):
R$^{n1}$, R$^{n2}$ and R$^{n3}$ are independently selected from H and C$_{1-6}$ alkyl, which is optionally substituted with 1, 2, or 3 substituents independently selected from hydroxyl, C$_{1-6}$ alkoxy, amino, C$_{1-6}$ alkylamino, di(C$_{1-6}$ alkyl) amino, and carboxy.

In some embodiments, the organic amine is a hydrazine compound of Formula (IVb):

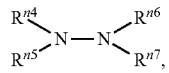
(IVb)

or a salt thereof, where:

$R^{n4}$, $R^{n5}$, $R^{n6}$, and $R^{n7}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl; or any two $R^{n4}$ and $R^{n5}$, or any two $R^{n6}$ and $R^{n7}$, together with the N atom to which they are attached form a 4-7 membered heterocycloalkyl, which is optionally substituted with 1, 2, 3, 4, or 5 substituents independently selected from $C_{1-6}$ alkyl, hydroxyl, $C_{1-6}$ alkoxy, amino, $C_{1-6}$ alkylamino, di($C_{1-6}$ alkyl)amino, carboxy and, carbamyl.

In some embodiments of the hydrazine compound of Formula (IVb):

$R^{n4}$, $R^{n5}$, $R^{n6}$, and $R^{n7}$ are independently selected from H and $C_{1-6}$ alkyl, which is optionally substituted with 1, 2, or 3 substituents independently selected from hydroxyl, $C_{1-6}$ alkoxy, amino, $C_{1-6}$ alkylamino, di($C_{1-6}$ alkyl)amino, and carboxy.

In some embodiments, the organic amine is an ethyleneimine compound of Formula (IVc):

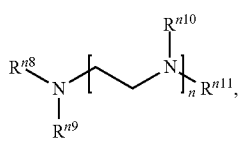
(IVc)

or a salt thereof, where:

n is an integer from 1 to 10, $R^{n8}$, $R^{n9}$, $R^{n10}$, and $R^{n11}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl; or any two $R^{n8}$ and $R^{n9}$, or any two $R^{n10}$ and $R^{n11}$, together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, and carbamyl.

In some embodiments of the ethyleneimine compound of Formula (IVc):

n is an integer from 1 to 8, and $R^{n8}$, $R^{n9}$, $R^{n10}$ and $R^{n11}$ are independently selected from H and $C_{1-6}$ alkyl, which is optionally substituted with 1, 2, or 3 substituents independently selected from amino, $C_{1-6}$ alkylamino, di($C_{1-6}$ alkyl)amino, carboxy, and carbamyl.

In some embodiments, the organic amine is a hydrazide compound of Formula (IIa) or Formula (IIb):

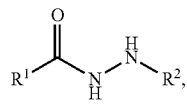
(IIa)

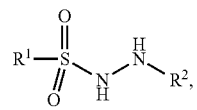
(IIb)

or a salt thereof, where:

$R^1$ is selected from H, $C_{1-6}$ alkyl, $C_{6-10}$ aryl, and —NH—$NH_2$, where said $C_{6-10}$ aryl is optionally substituted with 1, 2, or 3 substituents independently selected from $C_{1-6}$ alkyl, hydroxyl, amino, $C_{1-6}$ alkoxy, and $NO_2$; and $R^2$ is selected from H, $C_{1-6}$ alkyl, carboxy, carbamyl, $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl.

In some embodiments of the hydrazide compound of Formula (IIa) or Formula (IIb):

$R^1$ is selected from $C_{6-10}$ aryl and —NH—$NH_2$, where said $C_{6-10}$ aryl is optionally substituted with 1, 2, or 3 substituents independently selected from $C_{1-6}$ alkyl and $NO_2$; and $R^2$ is selected from H, carboxy, carbamyl, and aminosulfonyl.

In some embodiments, the organic amine is selected from: carbohydrazide, p-toluenesulfonyl hydrazide, hydrazine, triethanolamine, ethylene diamine, tetraethylene pentamine (TEPA), diethyletriamine (DETA), triethylenetetramine (TETA), and polyethyleneimine, or a salt thereof.

In some embodiments, an amount of the organic amine in the composition is from about 1 wt. % to about 10 wt. %.

In some embodiments, the composition comprises a foaming surfactant.

In some embodiments, the composition comprises a viscosifier.

In some embodiments, pH of the composition is from about 4 to about 9.

In some embodiments, the present disclosure provides a method of modulating density of a wellbore fluid, the method comprising adding a gas-generating aqueous composition of the present application to the wellbore fluid.

In some embodiments, the method comprises adding to the wellbore fluid a composition comprising an oxidizing compound.

In some embodiments, the oxidizing compound is selected from: a peroxysulfate, a peroxycarbonate, a peroxyborate, a peroxide, a hypochlorite, and an organic peracid.

Unless otherwise defined, all technical and scientific terms used here have the same meaning as commonly understood by one of ordinary skill in the art to which the present application belongs. Methods and materials are described here for use in the present application; other, suitable methods and materials known in the art can also be used. The materials, methods, and examples are illustrative only and not intended to be limiting.

Other features and advantages of the present application will be apparent from the following detailed description and figures, and from the claims.

DETAILED DESCRIPTION

Accordingly, the present application provides a composition containing a gas-generating compound and an activator compound. This composition can generate gas (for example, $N_2$) on-demand, for example, after addition to a wellbore fluid and pumping the fluid downhole. Examples of embodiments of such compositions, and methods of making and using these compositions, are described here.

Definitions

As used in this application, the singular forms "a," "an," and "the" include plural referents unless the context clearly dictates otherwise.

As used in this application, the term "about" means "approximately" (for example, plus or minus approximately 10% of the indicated value).

As used in this application, the term "room temperature" refers to a temperature of about 15° C. to about 28° C.

As used in this application, the term "standard temperature and pressure" refers to 20° C. and 101 kPa.

As used in this application, the term "compressibility" refers to a measure of the relative volume change of a fluid as a response to a pressure. The term compressibility describes the ability of a fluid to be compacted (made more dense). For example, fluid may be 10 v/v %, 20 v/v %, 30 v/v %, 40 v/v %, or 50 v/v % compressible. An incompressible fluid cannot be compressed and has relatively constant volume and density throughout.

As used in this application, the term "azo compound" refers to a compound containing an azo group of formula —N=N—.

As used in this application, the term "hydrazide compound" refers to a compound containing a hydrazide group of formula —C(=O)NHNH— or —S(=O)$_2$NHNH—.

As used in this application the term "semicarbazide compound" refers to a compound containing a semicarbazide group of formula —NHC(=O)NHNH—.

As used in this application, the term "oxidizing compound" refers to a chemical substance that has the ability to cause other substances to lose electrons. Examples of oxidizers include oxygen, hydrogen peroxide and the halogens.

As used in this application, the term "carbamyl" refers to a group of formula —C(O)NH$_2$.

As used in this application, the term "$C_{n-m}$ alkylcarbamyl" refers to a group of formula —C(O)—NH($C_{n-m}$ alkyl), where the alkyl group has n to m carbon atoms.

As used in this application, the term "di($C_{n-m}$-alkyl) carbamyl" refers to a group of formula —C(O)N($C_{n-m}$ alkyl)$_2$, where the two alkyl groups each has, independently, n to m carbon atoms. In some embodiments, each alkyl group independently has 1 to 6, 1 to 4, or 1 to 3 carbon atoms.

As used in this application, the term "aminosulfonyl" refers to a group of formula —S(O)$_2$NH$_2$.

As used in this application, the term "$C_{n-m}$ alkylaminosulfonyl" refers to a group of formula —S(O)$_2$NH($C_{n-m}$ alkyl), where the alkyl group has n to m carbon atoms. In some embodiments, the alkyl group has 1 to 6, 1 to 4, or 1 to 3 carbon atoms.

As used in this application, the term "di($C_{n-m}$ alkyl) aminosulfonyl" refers to a group of formula —S(O)$_2$N($C_{n-m}$ alkyl)$_2$, where each alkyl group independently has n to m carbon atoms. In some embodiments, each alkyl group has, independently, 1 to 6, 1 to 4, or 1 to 3 carbon atoms.

As used in this application, the term "$C_{n-m}$ alkyl", employed alone or in combination with other terms, refers to a saturated hydrocarbon group that may be straight-chain (linear) or branched, having n to m carbons. Alkyl moieties include, but are not limited to, chemical groups, for example, methyl, ethyl, n-propyl, isopropyl, n-butyl, tert-butyl, isobutyl, sec-butyl; higher homologs, for example, 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms. The term "$C_{n-m}$ alkylene" refers to a divalent alkyl group. Examples of alkylene groups include ethan-1,1-diyl, ethan-1,2-diyl, propan-1,1,-diyl, propan-1,3-diyl, propan-1,2-diyl, butan-1,4-diyl, butan-1,3-diyl, butan-1,2-diyl, 2-methyl-propan-1,3-diyl, and the like.

As used in this application, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used in this application, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

As used in this application, "$C_{n-m}$ cycloalkyl" refers to non-aromatic cyclic hydrocarbons including cyclized alkyl or alkenyl groups. Cycloalkyl groups can include mono- or polycyclic (for example, having 2, 3 or 4 fused rings) groups and spirocycles. Ring-forming carbon atoms of a cycloalkyl group can be optionally substituted by 1 or 2 independently selected oxo or sulfide groups (for example, C(O) or C(S)). Also included in the definition of cycloalkyl are moieties that have one or more aromatic rings fused (for example, having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring. Cycloalkyl groups can have 3, 4, 5, 6, 7, 8, 9, or 10 ring-forming carbons ($C_{3-10}$). In some embodiments, the cycloalkyl is a $C_{3-10}$ monocyclic or bicyclic cyclocalkyl. In some embodiments, the cycloalkyl is a $C_{3-7}$ monocyclic cyclocalkyl. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, adamantyl, and the like. In some embodiments, cycloalkyl is cyclopropyl, cyclobutyl, cyclopentyl, or cyclohexyl.

As used in this application, "heterocycloalkyl" or "aliphatic heterocycle" refers to non-aromatic saturated or unsaturated monocyclic or polycyclic heterocycles having one or more ring-forming heteroatoms selected from O, N, or S. Included in heterocycloalkyl are monocyclic 4-, 5-, 6-, 7-, 8-, 9- or 10-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido groups (for example, C(O), S(O), C(S), or S(O)$_2$). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. In some embodiments, the heterocycloalkyl group is unsaturated (for example, the heterocycloalkyl contains at least one double bond). Also included in the definition of heterocycloalkyl are moieties that have one or more aromatic rings fused (for example, having a bond in common with) to the non-aromatic heterocycle, for example, benzo or thienyl derivatives of piperidine, morpholine, and azepine. A heterocycloalkyl group containing a fused aromatic ring can be attached through any ring-forming atom including a ring-forming atom of the fused aromatic ring. In some embodiments, the heterocycloalkyl is a monocyclic 4-6 membered heterocycloalkyl having 1 or 2 heteroatoms independently selected from nitrogen, oxygen, or sulfur and having one or more oxidized ring members. In some embodiments, the heterocycloalkyl is a monocyclic or bicyclic 4-10 membered heterocycloalkyl having 1, 2, 3, or 4 heteroatoms independently selected from nitrogen, oxygen, or sulfur and having one or more oxidized ring members. In some embodiments, the heterocycloalkyl is a 8-12-membered heterocycloalkyl (for example, bicyclic heterocycloalkyl). In some embodiments, the heterocycloalkyl is a 8-16-membered heterocycloalkyl (for example, bicyclic or tricyclic heterocycloalkyl). In some embodiments, the 8-12 membered bicyclic heterocycloalkyl is a 8-12 membered fused heterocycloalkylaryl group or a 8-12 membered fused heterocycloalkylheteroaryl group. In some embodiments, the heterocycloalkyl is a 9-12 membered bicyclic heterocycloalkyl. In some embodiments, the 9-10 membered bicyclic heterocycloalkyl is a 9-10 membered fused heterocycloalkylaryl group or a 9-10 membered fused heterocycloalkylheteroaryl group. The term "heterocycloalkylene" refers to a divalent heterocycloalkyl linking group.

As used in this application, the term "aryl," employed alone or in combination with other terms, refers to an aromatic hydrocarbon group, which may be monocyclic or polycyclic (for example, having 2, 3 or 4 fused rings). The term "$C_{n-m}$ aryl" refers to an aryl group having from n to m ring carbon atoms. Aryl groups include, for example, phenyl, naphthyl, anthracenyl, phenanthrenyl, indanyl, indenyl, and the like. In some embodiments, aryl groups have from 6 to 10 carbon atoms. In some embodiments, the aryl group is phenyl or naphthyl.

As used in this application, the term "hydroxyl" refers to a group of formula —OH.

As used in this application, the term "carboxy" refers to a —C(O)OH group.

As used in this application, the term "$C_{n-m}$ alkoxy", employed alone or in combination with other terms, refers to a group of formula —O-alkyl, in this application the alkyl group has n to m carbons. Example alkoxy groups include, but are not limited to, methoxy, ethoxy, propoxy (for example, n-propoxy and isopropoxy), butoxy (for example, n-butoxy and tert-butoxy), and the like. In some embodiments, the alkyl group has 1 to 6, 1 to 4, or 1 to 3 carbon atoms.

As used in this application, the term "amino" refers to a group of formula —NH$_2$.

As used in this application, the term "$C_{n-m}$ alkylamino" refers to a group of formula —NH(alkyl), in this application the alkyl group has n to m carbon atoms. In some embodiments, the alkyl group has 1 to 6, 1 to 4, or 1 to 3 carbon atoms. Examples of alkylamino groups include, but are not limited to, N-methylamino, N-ethylamino, N-propylamino (for example, N-(n-propyl)amino and N-isopropylamino), N-butylamino (for example, N-(n-butyl)amino and N-(tert-butyl)amino), and the like.

As used in this application, the term "di($C_{n-m}$ alkyl) amino" refers to a group of formula —N(alkyl)$_2$, in this application each alkyl group independently has n to m carbon atoms. In some embodiments, each alkyl group has 1 to 6, 1 to 4, or 1 to 3 carbon atoms. Examples of dialkylamino groups include, but are not limited to, N,N-methylehtylamino, N,N-diethylamino, N,N-propylethylamino, N,N-butylisopropylamino, and the like.

As used in this application, the term "$C_{n-m}$ alkylcarbonylamino" refers to a group of formula —NHC(O)-alkyl, in this application the alkyl group has n to m carbon atoms. In some embodiments, the alkyl group has 1 to 6, 1 to 4, or 1 to 3 carbon atoms.

As used in this application, the term "$C_{n-m}$ alkylsulfonylamino" refers to a group of formula —NHS(O)$_2$-alkyl, in this application the alkyl group has n to m carbon atoms. In some embodiments, the alkyl group has 1 to 6, 1 to 4, or 1 to 3 carbon atoms.

As used in this application, the term "aminosulfonylamino" refers to a group of formula —NHS(O)$_2$NH$_2$.

As used in this application, the term "$C_{n-m}$ alkylaminosulfonylamino" refers to a group of formula —NHS(O)$_2$NH(alkyl), in this application the alkyl group has n to m carbon atoms. In some embodiments, the alkyl group has 1 to 6, 1 to 4, or 1 to 3 carbon atoms.

As used in this application, the term "di($C_{n-m}$ alkyl) aminosulfonylamino" refers to a group of formula —NHS(O)$_2$N(alkyl)$_2$, in this application each alkyl group independently has n to m carbon atoms. In some embodiments, each alkyl group has, independently, 1 to 6, 1 to 4, or 1 to 3 carbon atoms.

As used in this application, the term "aminocarbonylamino", employed alone or in combination with other terms, refers to a group of formula —NHC(O)NH$_2$.

As used in this application, the term "$C_{n-m}$ alkylaminocarbonylamino" refers to a group of formula —NHC(O)NH(alkyl), in this application the alkyl group has n to m carbon atoms. In some embodiments, the alkyl group has 1 to 6, 1 to 4, or 1 to 3 carbon atoms.

As used in this application, the term "di($C_{n-m}$ alkyl) aminocarbonylamino" refers to a group of formula —NHC(O)N(alkyl)$_2$, in this application each alkyl group independently has n to m carbon atoms. In some embodiments, each alkyl group has, independently, 1 to 6, 1 to 4, or 1 to 3 carbon atoms.

As used in this application, the term "hydroxy sulfobetaine" refers to a moiety of formula:

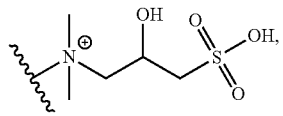 [SMILES: *[N+](C)(C)CC(O)CS(=O)(=O)O]

or a salt thereof. In some embodiments, a salt of the hydroxy sulfobetaine moiety is the sodium salt. The squiggly line represents a surface to which the hydroxyl sulfobetaine can bind.

The term "downhole" as used in this application refers to under the surface of the earth, for example, a location within or fluidly connected to a wellbore.

As used in this application, the term "drilling fluid" refers to fluids, slurries, or muds used in drilling operations downhole, for example, during the formation of the wellbore.

As used in this application, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this application, the term "clean-up fluid" refers to fluids or slurries used downhole during clean-up activities of the well, for example, any treatment to remove material obstructing the flow of desired material from the subterranean formation. In one example, a clean-up fluid can be an acidification treatment to remove material formed by one or more perforation treatments. In another example, a clean-up fluid can be used to remove a filter cake (mudcake).

As used in this application, the term "fracturing fluid" refers to fluids or slurries used downhole during fracturing operations.

As used in this application, the term "completion fluid" refers to fluids or slurries used downhole during the completion phase of a well, including cementing compositions.

As used in this application, the term "remedial treatment fluid" refers to fluids or slurries used downhole for remedial treatment of a well. Remedial treatments can include treatments designed to increase or maintain the production rate of a well, for example, stimulation or clean-up treatments.

As used in this application, the term "cementing fluid" refers to fluids or slurries used during cementing operations of a well. For example, a cementing fluid can include an aqueous mixture including at least one of cement and cement kiln dust. In another example, a cementing fluid can include a curable resinous material, for example, a polymer that is in an at least partially uncured state.

As used in this application, a "carrier fluid" refers to any suitable fluid for suspending, dissolving, mixing, or emulsifying with one or more materials (solid particular materials) to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (for example, a fatty acid methyl ester), 2-butoxy ethanol, butyl acetate, butyl lactate, furfuryl acetate, dimethyl sulfoxide, dimethyl formamide, a petroleum distillation product of fraction (for example, diesel, kerosene, naphthas, and the like) mineral oil, a hydrocarbon oil, a hydrocarbon including an aromatic carbon-carbon bond (for example, benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (for example, cyclohexanone, hexane), water, brine, produced water, flowback water, brackish water, and sea water. The fluid can form about 0.001 wt. % to about 99.999 wt. % of a composition, or a mixture including the same, or about 0.001 wt. % or less, 0.01 wt. %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt. % or more.

As used in this application, the term "fluid" refers to liquids and gels, unless otherwise indicated.

As used in this application, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact with the wellbore. Subterranean materials can include any materials placed into the wellbore, for example, cement, drill shafts, liners, tubing, casing, or screens; placing a material in a subterranean formation can include contacting with such subterranean materials. In some examples, a subterranean formation or material can be any subsurface region that can produce liquid or gaseous petroleum materials, water or combinations of them. For example, a subterranean formation or material can be at least one of an area desired to be fractured, a fracture or an area surrounding a fracture, and a flow pathway or an area surrounding a flow pathway, in this application a fracture or a flow pathway can be optionally fluidly connected to a subterranean petroleum- or water-producing region, directly or through one or more fractures or flow pathways.

As used in this application, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

Introduction

In general, the disclosure provides various gas-generating compositions. Such compositions may be added to a wellbore fluid, and may generate gas in the wellbore fluid thereby modulating density and compressibility of the wellbore fluid. Such compositions typically contain an azo compound and an organic amine, and optionally a viscosifier, a foaming or foam stabilizing surfactant, at least one additional ingredient, or any combination thereof. To aid in gas generation, an oxidizing compound may also be added to the wellbore fluid. Various embodiments of the azo compounds, organic amines, viscosifiers, foaming or foam stabilizing surfactants, oxidizing compounds, additional ingredients, as well as their amounts in the gas-generating compositions, are described later.

Examples of Azo Compounds

In some embodiments, an azo compound has Formula (I):

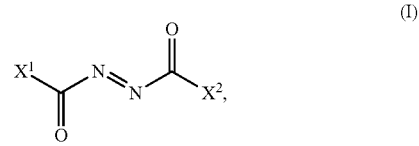

or a salt thereof, where:

$X^1$ and $X^2$ are each independently selected from $C_{1-6}$ alkyl, $C_{2-6}$ alkenyl, $C_{2-6}$ alkynyl, $OR^{a1}$, and $NR^{c1}R^{d1}$; and each $R^{a1}$, $R^{c1}$, and $R^{d1}$ is independently selected from H, $C_{1-6}$ alkyl, $C_{2-6}$ alkenyl, $C_{2-6}$ alkynyl, $C_{3-7}$ cycloalkyl, and $C_{6-10}$ aryl, where said $C_{1-6}$ alkyl is optionally substituted with $C_{6-10}$ aryl.

In some embodiments, $X^1$ is selected from $C_{1-6}$ alkyl, $C_{2-6}$ alkenyl, $OR^{a1}$, and $NR^{c1}R^{d1}$. In some embodiments, $X^1$ is selected from $C_{1-6}$ alkyl and $C_{2-6}$ alkenyl. In some embodiments, $X^1$ is selected from $OR^{a1}$ and $NR^{c1}R^{d1}$. In some embodiments, $X^1$ is $C_{1-6}$ alkyl. In some embodiments, $X^1$ is $C_{2-6}$ alkenyl. In some embodiments, $X^1$ is $OR^{a1}$. In some embodiments, $X^1$ is $NR^{c1}R^{d1}$.

In some embodiments, $X^2$ is selected from $C_{1-6}$ alkyl, $C_{2-6}$ alkenyl, $OR^{a1}$, and $NR^{c1}R^{d1}$. In some embodiments, $X^2$ is selected from $C_{1-6}$ alkyl and $C_{2-6}$ alkenyl. In some embodiments, $X^2$ is selected from $OR^{a1}$ and $NR^{c1}R^{d1}$. In some embodiments, $X^2$ is $C_{1-6}$ alkyl. In some embodiments, $X^2$ is $C_{2-6}$ alkenyl. In some embodiments, $X^2$ is $OR^{a1}$. In some embodiments, $X^2$ is $NR^{c1}R^{d1}$.

In some embodiments, $X^1$ and $X^2$ are each independently selected from $C_{1-6}$ alkyl and $C_{2-6}$ alkenyl. In some embodiments, $X^1$ and $X^2$ are each independently selected from $OR^{a1}$ and $NR^{c1}R^{d1}$. In some embodiments, $X^1$ is $C_{1-6}$ alkyl and $X^2$ is $C_{2-6}$ alkenyl. In some embodiments, $X^1$ is $C_{1-6}$ alkyl and $X^2$ is $OR^{a1}$. In some embodiments, $X^1$ is $C_{2-6}$ alkenyl and $X^2$ is $OR^{a1}$. In some embodiments, $X^1$ is $C_{1-6}$ alkyl and $X^2$ is $NR^{c1}R^{d1}$. In some embodiments, $X^1$ is $C_{1-6}$ alkyl and $X^2$ is $NR^{c1}R^{d1}$.

In some embodiments, $X^1$ and $X^2$ are each $C_{1-6}$ alkyl. In some embodiments, $X^1$ and $X^2$ are each $C_{2-6}$ alkenyl. In some embodiments, $X^1$ and $X^2$ are each $OR^{a1}$ and the compound of Formula (I) has Formula (Ia):

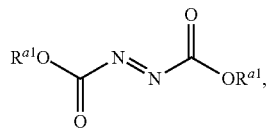

(Ia)

or a salt thereof.

In some embodiments, $X^1$ is $OR^{a1}$, $X^2$ is $NR^{c1}R^{d1}$, and the compound of Formula (I) has Formula (Ib):

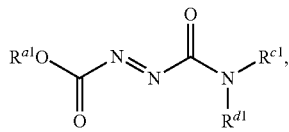

(Ib)

or a salt thereof.

In some embodiments, $X^1$ and $X^2$ are each $NR^{c1}R^{d1}$, and the compound of Formula (I) has Formula (Ic):

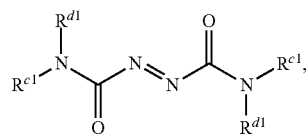

(Ic)

or a salt thereof.

In some embodiments, $R^{a1}$ is selected from H, $C_{1-6}$ alkyl, $C_{2-6}$ alkenyl, $C_{2-6}$ alkynyl, $C_{3-7}$ cycloalkyl, and $C_{6-10}$ aryl. In some embodiments, $R^{a1}$ is $C_{6-10}$ aryl-$C_{1-3}$ alkylene. In some embodiments, $R^{a1}$ is H. In some embodiments, $R^{a1}$ is $C_{1-6}$ alkyl. In some embodiments, $R^{a1}$ is $C_{2-6}$ alkenyl. In some embodiments, $R^{a1}$ is $C_{3-7}$ cycloalkyl. In some embodiments, $R^{a1}$ is $C_{6-10}$ aryl.

In some embodiments, $R^{c1}$ and $R^{d1}$ are independently selected from H, $C_{1-6}$ alkyl, and $C_{2-6}$ alkenyl. In some embodiments, $R^{c1}$ and $R^{d1}$ are independently selected from H and $C_{1-6}$ alkyl. In some embodiments, $R^{c1}$ and $R^{d1}$ are each H. In some embodiments, $R^{c1}$ and $R^{d1}$ are each $C_{1-6}$ alkyl. In some embodiments, $R^{c1}$ are each H and $R^{d1}$ is $C_{6-10}$ aryl-$C_{1-3}$ alkylene.

In some embodiments, $R^{a1}$, $R^{c1}$ and $R^{d1}$ are each H. In some embodiments, $R^{a1}$ and $R^{c1}$ are each H, and $R^{d1}$ is $C_{1-6}$ alkyl. In some embodiments, $R^{a1}$ is selected from $C_{1-6}$ alkyl, $C_{2-6}$ alkenyl, $C_{3-7}$ cycloalkyl, and $C_{6-10}$ aryl; $R^{c1}$ is H, and $R^{d1}$ is selected from H and $C_{1-6}$ alkyl. In some embodiments, each $R^{a1}$, $R^{c1}$ and $R^{d1}$ is independently selected from H and $C_{1-6}$ alkyl.

In some embodiments, an azo compound of Formula (I) is azodicarbonamide (also known as AZDC, carbamoyliminourea, azo(bis)formamide, and diazenedicarboxamide, CAS Registry No. 123-77-3) having the following structure:

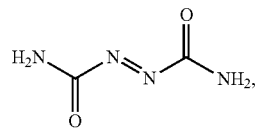

or a salt thereof.

In some embodiments, an azo compound of Formula (I) is azodicarboxylic acid (CAS Registry No. 4910-62-7) having the following structure:

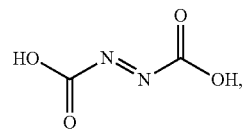

or a salt thereof.

In some embodiments, the compound of Formula (I) is diethyl diazenedicarboxylate (also known as DEAD, CAS Registry No. 1972-28-7) having the following structure:

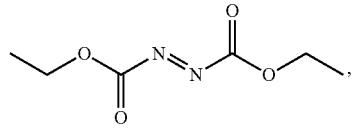

or a salt thereof.

In some embodiments, the compound of Formula (I) is diisopropyl azodicarboxylate (also known as DIAD, CAS Registry No. 2446-83-5) having the following structure:

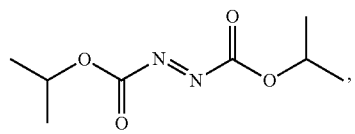

or a salt thereof.

In some embodiments, the compound of Formula (I) is selected from any one of the following compounds:

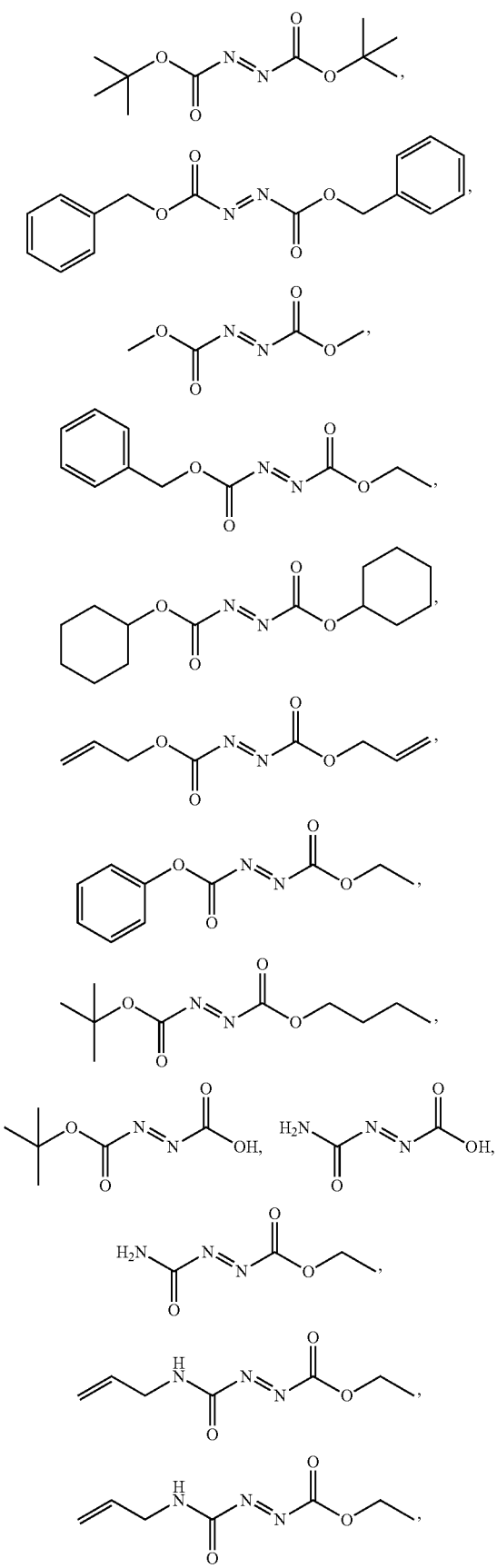

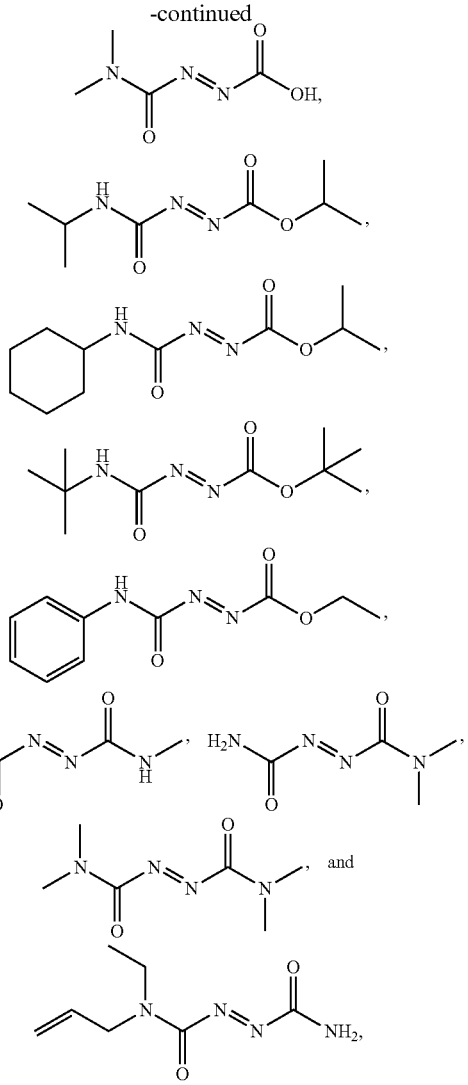

or a salt thereof.

In some embodiments, the composition contains from about 0.5 wt. % to about 25 wt. %, from about 1 wt. % to about 20 wt. %, from about 1 wt. % to about 10 wt. %, from about 3 wt. % to about 5 wt. %, from about 2 wt. % to about 18 wt. %, or from about 3 wt. % to about 15 wt. % of the azo compound. In some embodiments, the aqueous composition contains about 0.5 wt. %, about 1 wt. %, about 2 wt. %, about 3 wt. %, about 3.5 wt. %, about 4 wt. %, about 4.5 wt. %, about 5 wt. %, about 7.5 wt. %, about 10 wt. %, about 15 wt. %, or about 20 wt. % of the azo compound.

In some embodiments, azo compound in the aqueous composition is the gas-generating chemical. That is, without being bound to any particular theory, it is believed that upon activation, azo compound decomposes to produce gas. Depending on the actual chemical structure of the azo compound, nitrogen gas, carbon monoxide, carbon dioxide, ammonia, lower alkyl amines, alkylene (for example, ethylene, propylene, or isobutene), or any combinations thereof, may be released upon decomposition of the azo compound.

For example, when the azo compound is azodicarbonamide (AZDC), the azo compound may decompose to produce a gaseous mixture is shown in Scheme 1.

Scheme 1

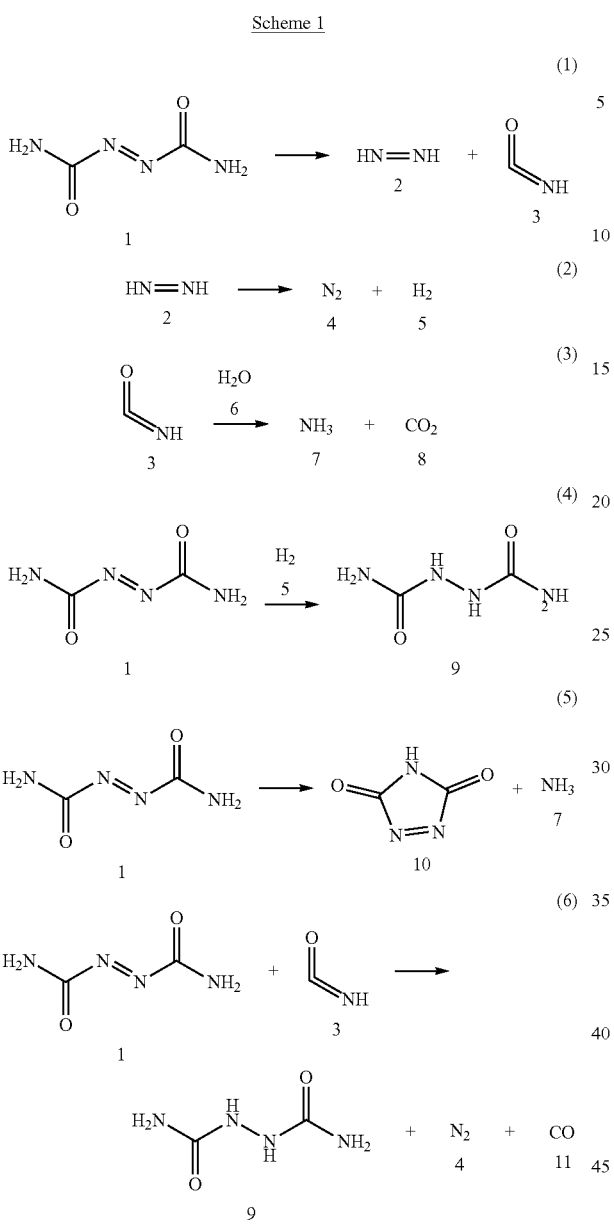

Referring to Scheme 1, when azodicarbonamide 1 is activated, for example, by heat, the compound 1 decomposes to yield diimide 2 and isocyanic acid 3, as shown in equation (1). As shown in equation (2), the diimide 2 further disproportionates to produce nitrogen gas 4 and hydrogen gas 5. As shown in equation (3), in an aqueous environment, isocyanic acid 3 is hydrolyzed to produce ammonia gas 7 and carbon dioxide 8. As shown in equation (4), the hydrogen gas that has been produced after disproportionation of diimide 2 may also reduce the unreacted azodicarbonamide 1, to produce hydrazinodicarboxamide 9, which is no longer active and may not generate any gaseous compounds in the composition. Additionally, as shown in equation (5), azodicarbonamide 1 may undergo a cyclization reaction to form urazole 10 and ammonia gas 7. Finally, as shown in equation (6), two moles of isocyanic acid 3 may react with one mole of the starting material azodicarbonamide 1 to produce inactive hydrazinodicarboxamide 9, nitrogen gas 4, and also carbon monoxide 11. In sum, decomposition of azodicarbonamide (AZDC) yields nitrogen gas, hydrogen gas, ammonia gas, carbon dioxide gas, and carbon monoxide gas, and also produces some amount of inactive compound hydrazinodicarboxamide.

In another example, when the azo compound is azodicarboxylic acid, the azo compound may decompose to produce a gaseous mixture as shown in Scheme 2.

Scheme 2

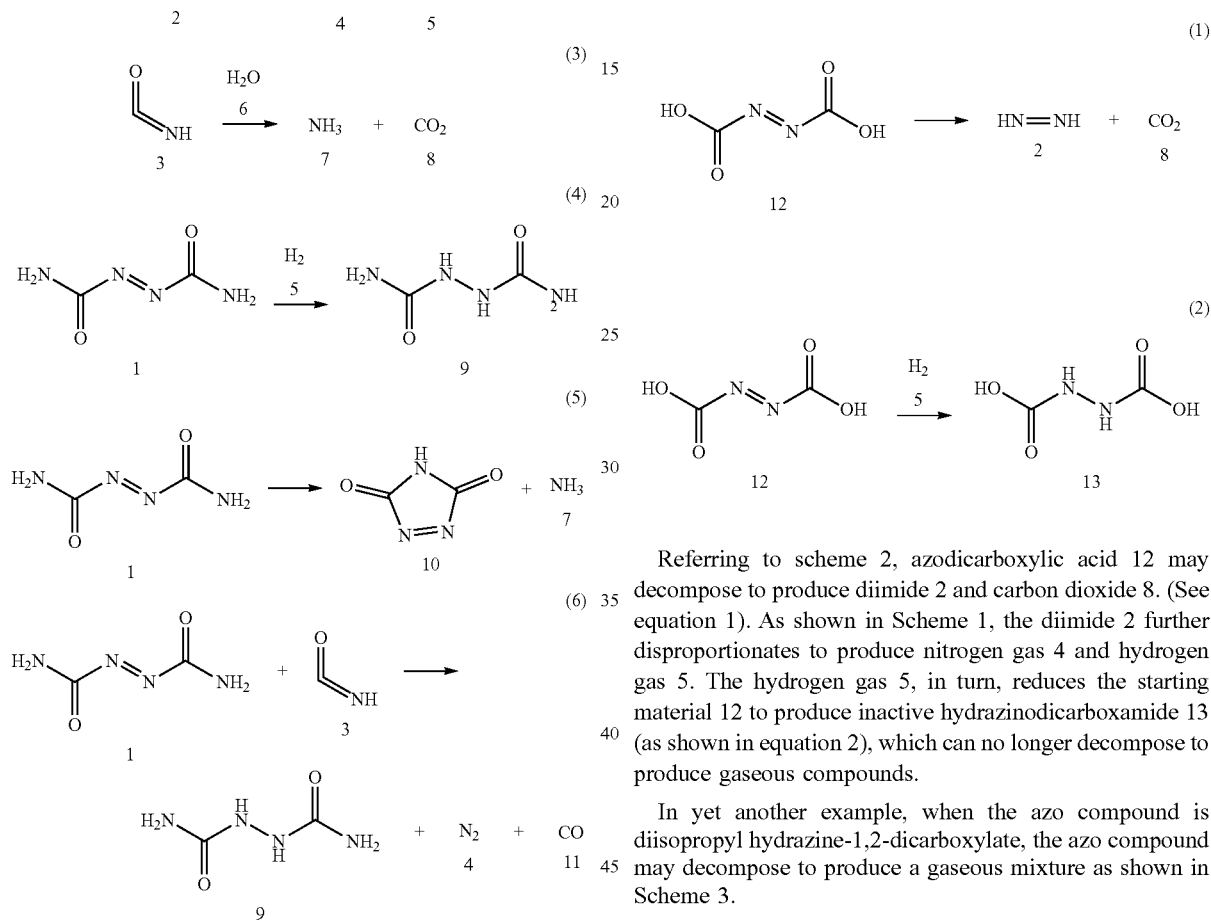

Referring to scheme 2, azodicarboxylic acid 12 may decompose to produce diimide 2 and carbon dioxide 8. (See equation 1). As shown in Scheme 1, the diimide 2 further disproportionates to produce nitrogen gas 4 and hydrogen gas 5. The hydrogen gas 5, in turn, reduces the starting material 12 to produce inactive hydrazinodicarboxamide 13 (as shown in equation 2), which can no longer decompose to produce gaseous compounds.

In yet another example, when the azo compound is diisopropyl hydrazine-1,2-dicarboxylate, the azo compound may decompose to produce a gaseous mixture as shown in Scheme 3.

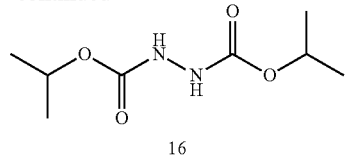

16

Referring to scheme 3, diisopropyl hydrazine-1,2-dicarboxylate 14 may decompose to produce diimide 2, carbon dioxide 8, and ethylene 15. (See equation 1). As shown in Scheme 1, the diimide 2 further disproportionates to produce nitrogen gas 4 and hydrogen gas 5. The hydrogen gas 5, in turn, reduces the starting material 14 to produce inactive diisopropyl hydrazine-1,2-dicarboxylate 16 (as shown in equation 2), which can no longer decompose to produce gaseous compounds.

In some embodiments, the decomposition of azo compound is activated by elevated temperature (for example, temperature in the wellbore greater than 100° C.), basic pH, presence of an activator compound (for example, any of the amine compounds described later), or any combination of these activating factors. In some embodiments, decomposition of azo compound and gas release are activated by the presence of an organic amine activator compound. In some embodiments, decomposition of azo compound and gas release are activated by elevated temperature in the wellbore and the presence of an amine activator compound. In some embodiments, decomposition of azo compound and gas release are activated by basic pH, elevated temperature in the wellbore, and the presence of an organic amine compound.

In some embodiments, an azo compound decomposes at a temperature from about 80° C. to about 250° C., from about 100° C. to about 225° C., from about 120° C. to about 210° C., from about 125° C. to about 200° C., or from about 150° C. to about 200° C. In some embodiments, an azo compound decomposes at about 100° C., about 120° C., about 125° C., about 140° C., about 150° C., about 175° C., about 180° C., about 200° C., about 220° C., or about 250° C. In some embodiments, decomposition of the azo compound and release of gas is an endothermic process. In other embodiments, decomposition of the azo compound and release of gas is an exothermic process.

In some embodiments, any one of compounds of Formula (I) upon decomposition generates a reduced dicarboxyl derivative of hydrazine of Formula (V):

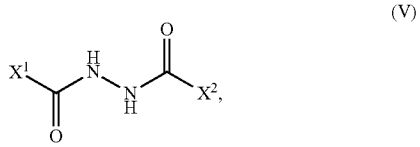

(V)

or salt thereof, where $X^1$ and $X^2$ are as described here for Formula (I). Examples of compounds of Formula (V) include hydrazine-1,2-dicarboxamide 9 (Scheme 1), hydrazine-1,2-dicarboxylic acid 13 (Scheme 2), and diisopropyl hydrazine-1,2-dicarboxylate 16 (Scheme 3).

In some embodiments, when an oxidizing compound is present in the wellbore fluid, the compound of Formula (V) reacts with the oxidizing compound to produce the corresponding azo compound of Formula (I), for example, as shown in Scheme 4.

Scheme 4

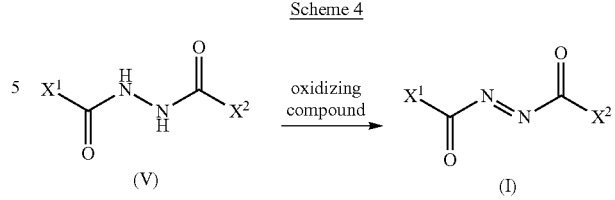

Referring to scheme 4, an oxidizing compound in its oxidized state reacts with the dicarboxyl hydrazine compound to generate a nitrogen-nitrogen double bond and hence to produce the azo compound of formula (I), and the reduced form of the oxidizing compound as a byproduct. That is, the compound of Formula (V) undergoes a dehydrogenation reaction upon contact with the oxidizer compound to reproduce an azo compound of Formula (I). Examples of oxidizer are described later.

Examples of Organic Amine Compounds

In some embodiments, an aqueous gas-generating composition of the present disclosure contains an organic amine compound.

In some embodiments, the organic amine compound is a primary, secondary or tertiary amine of Formula (IVa):

(IVa)

or a salt thereof, where:

$R^{n1}$, $R^{n2}$ and $R^{n3}$ are independently selected from H, $C_{1-6}$ alkyl, $C_{2-6}$ alkenyl, $C_{2-6}$ alkynyl, $C_{3-7}$ cycloalkyl, 4-7 membered heterocycloalkyl, and $C_{6-10}$ aryl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl) aminosulfonylamino, aminocarbonylamino, $C_{1-6}$ alkylaminocarbonylamino, and di($C_{1-6}$ alkyl)aminocarbonylamino; or any two $R^{n1}$ and $R^{n2}$, or any two $R^{n2}$ and $R^{n3}$, or any two $R^{n1}$ and $R^{n3}$ together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl) aminosulfonylamino, aminocarbonylamino, $C_{1-6}$ alkylaminocarbonylamino, and di($C_{1-6}$ alkyl)aminocarbonylamino.

In some embodiments, $R^{n1}$, $R^{n2}$ and $R^{n3}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, $R^{n1}$ is H, and $R^{n2}$ and $R^{n3}$ are independently selected from $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, $R^{n1}$, $R^{n2}$ and $R^{n3}$ are independently selected from H and $C_{1-6}$ alkyl, which is optionally substituted with 1, 2, or 3 substituents independently selected from hydroxyl, $C_{1-6}$ alkoxy, amino, $C_{1-6}$ alkylamino, di($C_{1-6}$ alkyl)amino, and carboxy.

In some embodiments, $R^{n1}$, $R^{n2}$ and $R^{n3}$ are independently $C_{1-6}$ alkyl, which is optionally substituted with 1, 2, or 3 substituents independently selected from hydroxyl, amino, and carboxy.

In some embodiments, any two $R^{n1}$ and $R^{n2}$, or any two $R^{n2}$ and $R^{n3}$, or any two $R^{n1}$ and $R^{n3}$ together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, and carbamyl.

In some embodiments, the compound of Formula (IVa) is triethanolamine (also known as tris(2-hydroxyethyl)amine, CAS Registry No. 102-71-6) having the following structure:

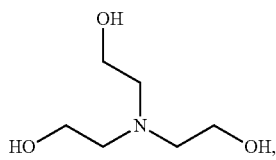

or a salt thereof.

In some embodiments, the compound of Formula (IVa) is selected from any one of the following compounds:

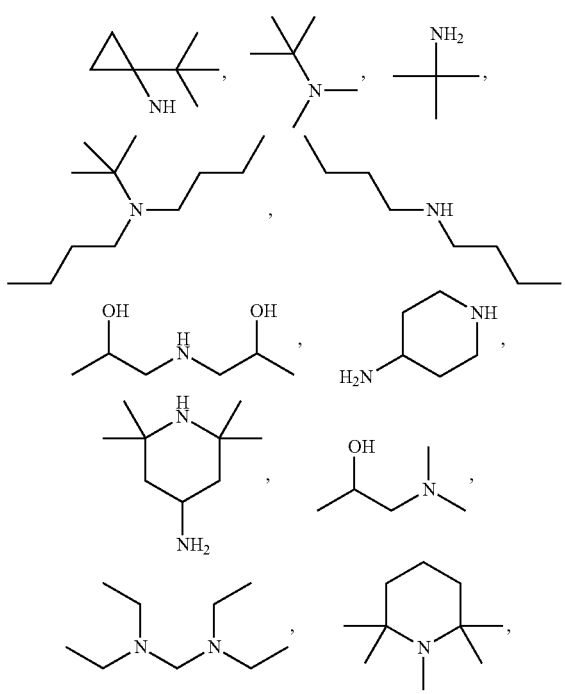

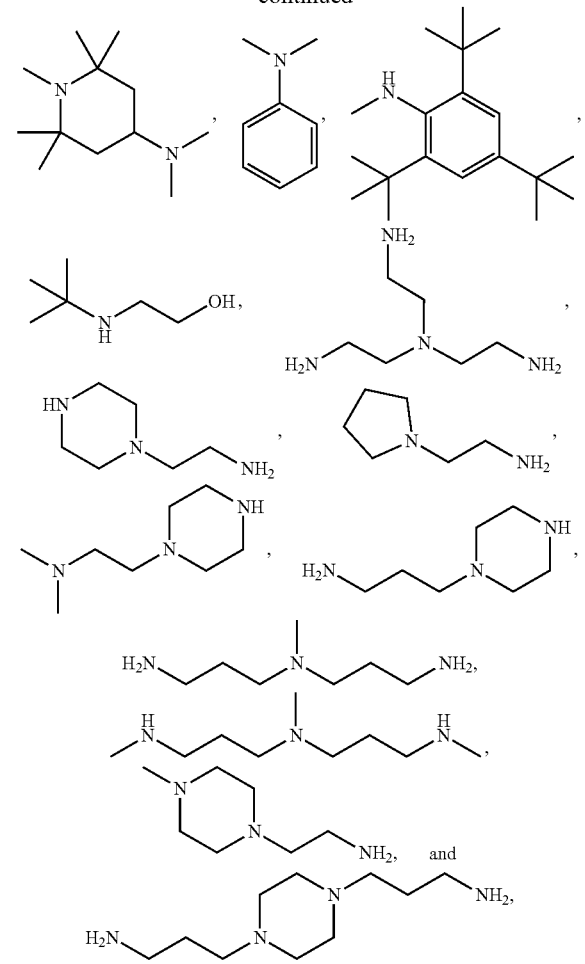

or a salt thereof.

In some embodiments, the organic amine compound is ammonia (for example, aqueous ammonia solution), ammonium hydrochloride, ammonium sulfate, ammonium hydrosulfate, ammonium carbamate, ammonium acetate, or ammonium oxalate.

In some embodiments, the organic amine compound is a hydrazine compound of Formula (IVb):

or a salt thereof, where:

$R^{n4}$, $R^{n5}$, $R^{n6}$, and $R^{n7}$ are independently selected from H, $C_{1-6}$ alkyl, $C_{2-6}$ alkenyl, $C_{2-6}$ alkynyl, $C_{3-7}$ cycloalkyl, 4-7 membered heterocycloalkyl, and $C_{6-10}$ aryl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino; or any two $R^{n4}$ and $R^{n5}$, or any two $R^{n6}$ and $R^{n7}$, together with the N atom to which they are attached form a 4-7 membered heterocycloalkyl, which is optionally substituted with 1, 2, 3, 4, or 5 substituents independently selected from $C_{1-6}$ alkyl, hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylcamino, and di($C_{1-6}$ alkyl)aminocarbonylamino.

In some embodiments, $R^{n4}$, $R^{n5}$, $R^{n6}$, and $R^{n7}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, $R^{n4}$ and $R^{n5}$ are each H, and $R^{n6}$ and $R^{n7}$ are independently selected from $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, $R^{n4}$, $R^n$s and $R^{n6}$ are each H, and $R^{n7}$ is selected from $C_{1-6}$ alkyl, $C_{3-7}$ cycloalkyl, and 6-12 membered aryl, each of which is optionally substituted with 1, 2, or 3 substituents independently selected from $C_{1-6}$ alkyl, hydroxyl, $C_{1-6}$ alkoxy, amino, $C_{1-6}$ alkylamino, di($C_{1-6}$ alkyl)amino, carboxy, and carbamyl.

In some embodiments, $R^{n4}$, $R^n$s, $R^{n6}$, and $R^{n7}$ are independently selected from H and $C_{1-6}$ alkyl, which is optionally substituted with 1, 2, or 3 substituents independently selected from hydroxyl, $C_{1-6}$ alkoxy, amino, $C_{1-6}$ alkylamino, di($C_{1-6}$ alkyl)amino, and carboxy.

In some embodiments, $R^{n4}$, $R^n$s, $R^{n6}$, and $R^{n7}$ are each independently $C_{1-6}$ alkyl, which is optionally substituted with 1, 2, or 3 substituents independently selected from hydroxyl, amino, and carboxy.

In some embodiments, any two $R^{n4}$ and $R^{n5}$, or any two $R^{n6}$ and $R^{n7}$, together with the N atom to which they are attached form a 4-7 membered heterocycloalkyl, which is optionally substituted with 1, 2, 3, 4, or 5 substituents independently selected from $C_{1-6}$ alkyl, hydroxyl, $C_{1-6}$ alkoxy, amino, $C_{1-6}$ alkylamino, di($C_{1-6}$ alkyl)amino, carboxy, and carbamyl.

In some embodiments, a hydrazine compound of Formula (IVb) is selected from hydrazine, hydrazine monohydrobromide, hydrazine hydrate, hydrazine sulfate, hydrazine acetate, hydrazine dihydrochloride, hydrazine monohydrochloride, and hydrazine acetate.

In some embodiments, a hydrazine compound of Formula (IVb) is selected from any one of the following compounds:

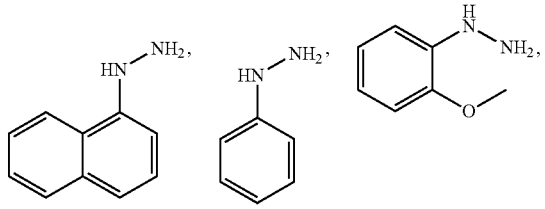

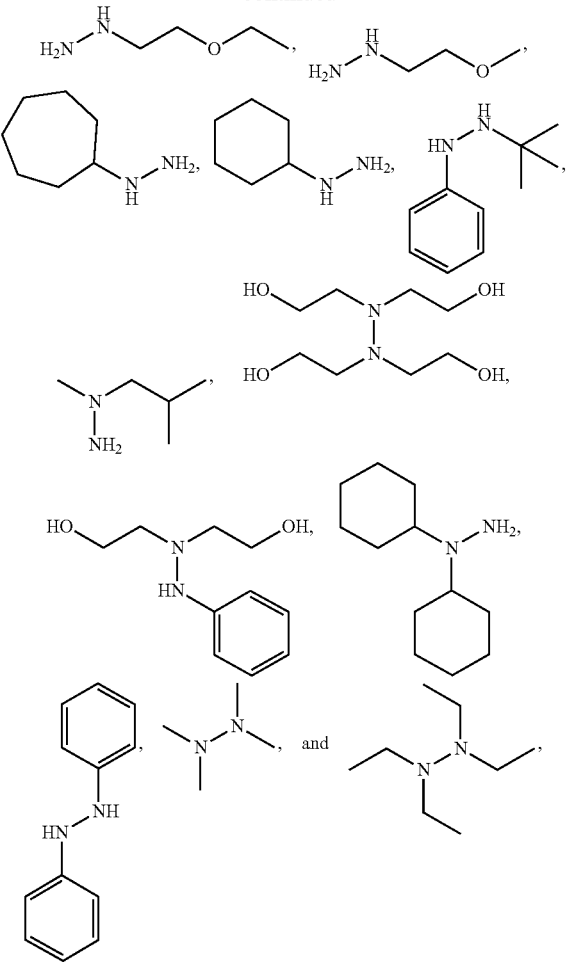

or salt thereof.

In some embodiments, the organic amine compound is an ethyleneimine compound of Formula (IVc):

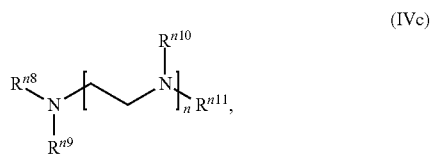

(IVc)

or a salt thereof, where:
n is an integer from 1 to 10,
$R^{n8}$, $R^{n9}$, $R^{n10}$, and $R^{n11}$ are independently selected from H, $C_{1-6}$ alkyl, $C_{2-6}$ alkenyl, $C_{2-6}$ alkynyl, $C_{3-7}$ cycloalkyl, 4-7 membered heterocycloalkyl, and $C_{6-10}$ aryl, each of which is optionally substituted with 1, 2, or 3 substituents independently selected from hydroxyl, $C_{1-6}$ alkoxy, $NH_2$—$C_{1-6}$ alkylene, OH—$C_{1-6}$ alkylene, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino; or any two $R^{n8}$ and $R^{n9}$, or any two $R^{n10}$ and $R^{n11}$, together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, carbamyl, $C_{1-6}$ alkylcarbamyl, di($C_{1-6}$ alkyl)carbamyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylcamino, and di($C_{1-6}$ alkyl)aminocarbonylamino.

In some embodiments, $R''^8$, $R''^9$, $R''^{10}$, and $R''^{11}$ are independently selected from H, $C_{1-6}$ alkyl, $C_{3-7}$ cycloalkyl, and 4-7 membered heterocycloalkyl, each of which is optionally substituted with 1, 2, or 3 substituents independently selected from hydroxyl, $C_{1-6}$ alkoxy, amino, $C_{1-6}$ alkylamino, di($C_{1-6}$ alkyl)amino, carboxy, and carbamyl.

In some embodiments, n is an integer from 1 to 8, and $R''^8$, $R''^9$, $R''^{10}$ and $R''^{11}$ are independently selected from H and $C_{1-6}$ alkyl, which is optionally substituted with 1, 2, or 3 substituents independently selected from amino, $C_{1-6}$ alkylamino, di($C_{1-6}$ alkyl)amino, carboxy, and carbamyl.

In some embodiments, n is an integer from 1 to 8, and $R''^8$, $R''^9$, $R''^{10}$ and $R''^{11}$ are each H. In some embodiments, $R''^8$, $R''^9$, $R''^{10}$, and $R''^{11}$ are each independently $C_{1-6}$ alkyl, which is optionally substituted with 1, 2, or 3 substituents independently selected from amino and carboxy.

In some embodiments, any two $R''^8$ and $R''^9$, or any two $R''^{10}$ and $R''^{11}$, together with the N atom to which they are attached form a 4-7 membered heterocycloalkyl, which is optionally substituted with 1, 2, 3, 4, or 5 substituents independently selected from $C_{1-6}$ alkyl, $NH_2$—$C_{1-6}$ alkylene, OH—$C_{1-6}$ alkylene, hydroxyl, $C_{1-6}$ alkoxy, amino, $C_{1-6}$ alkylamino, di($C_{1-6}$ alkyl)amino, carboxy, and carbamyl.

In some embodiments, the ethyleneimine compound of Formula (IVc) is selected from any one of the following compounds:

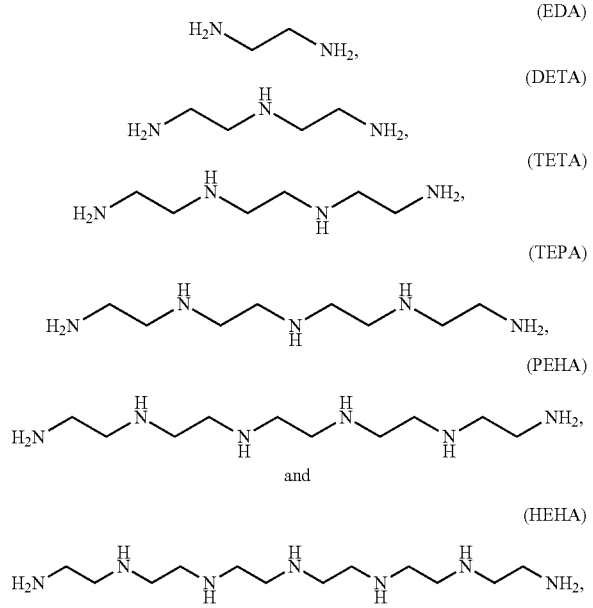

or a salt thereof.

In some embodiments, the gas-generating composition includes any combination of EDA, DETA, TETA, TEPA, PEHA and HEHA. For example, the gas-generating composition includes TETA and TEPA (for example, in equal amounts by weight). In another example, the gas generating composition includes TEPA, DETA, and TETA (for example, in equal amounts by weight).

In some embodiments, the organic amine compound is ethyleneimine compound selected from ethylene diamine (EDA), tetraethylene pentamine (TEPA), diethyletriamine (DETA), and polyethyleneimine, or a salt thereof.

In some embodiments, the organic amine compound is EDTA having the following structure:

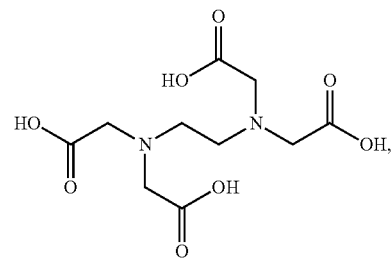 [SMILES: O=C(O)CN(CCN(CC(=O)O)CC(=O)O)CC(=O)O]

or a salt thereof.

In some embodiments, the organic amine compound is selected from any one of the following compounds:

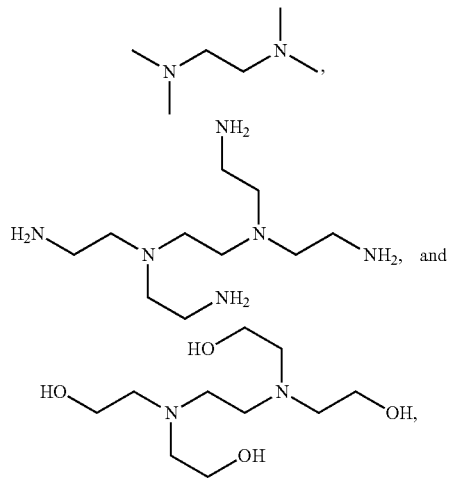

or a salt thereof.

In some embodiments, the organic amine compound is a polyethyleneimine, or a salt thereof. In some embodiments, the polyethyleneimine is linear. In other embodiments, the polyethyleneimine is branched (for example, CAS Reg. Nos. 9002-98-6, 25987-06-8). For example, a polyethyleneimine can have from 2 to 100 termini (for example, 2 to 80, 2 to 75, 2 to 60, 2 to 50, 2 to 40, 2 to 35, 2 to 25, 2 to 10, 2 to 5, 4 to 20, 5 to 25, 10 to 50, 25 to 75, 3 to 6, 5 to 15 termini). In some embodiments, a polyethyleneimine can have from 2 to 5, 4 to 6, 5 to 6, or 3 to 6 termini. In some embodiments, branched polyethyleneimine is V-shaped or T-shaped, depending on the method by which polyethyleneimine has been synthesized. In some embodiments, the polyethyleneimine has both linear and branched fragments. In some embodiments, the polyethyleneimine is alkylated (for example, methylated or ethylated). In some embodiments, the polyethyleneimine is PEGylated (for example reacted with ethylene oxide to form polyethylene glycol (PEG) chains having molecular weight between about 1,000 Da and about 100,000 Da).

In some embodiments, polyethyleneimine has average molecular weight between about 0.1 kDa to about 500 kDa. For example, molecular weight of polyethyleneimine may be between about 500 Da and about 100,000 Da. Polyethyleneimine described here can have a molecular weight of about 100,000 Da, 95,000 Da, 90,000 Da, 85,000 Da, 80,000 Da, 75,000 Da, 70,000 Da, 65,000 Da, 60,000 Da, 55,000 Da, 50,000 Da, 45,000 Da, 40,000 Da, 35,000 Da, 30,000 Da, 25,000 Da, 20,000 Da, 15,000 Da, 10,000 Da, 9,000 Da, 8,000 Da, 7,000 Da, 6,000 Da, 5,000 Da, 4,000 Da, 3,000 Da, 2,000 Da, 1,000 Da, 900 Da, 800 Da, 700 Da, 600 Da, or 500 Da. In some embodiments, the molecular weight of polyethyleneimine is between about 500 Da and about 50,000 Da. In some embodiments, molecular weight of polyethyleneimine is between about 500 Da and about 40,000 Da. In some embodiments, molecular weight of polyethyleneimine is between about 1,000 Da and about 40,000 Da. In some embodiments, molecular weight of the polyethyleneimine is between about 5,000 Da and about 40,000 Da. In some embodiments, molecular weight of polyethyleneimine is between about 10,000 Da and about 40,000 Da.

In some embodiments, the organic amine is a hydrazide compound having Formula (IIa) or Formula (IIb):

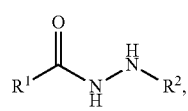

(IIa)

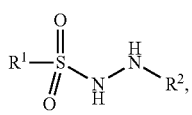

(IIb)

or a salt thereof, where:

$R^1$ is selected from H, $C_{1-6}$ alkyl, $C_{2-6}$ alkenyl, $C_{3-7}$ cycloalkyl, $C_{6-10}$ aryl, and —NH—NH$_2$, where said $C_{6-10}$ aryl is optionally substituted with 1, 2, or 3 substituents independently selected from $C_{1-6}$ alkyl, hydroxyl, amino, $C_{1-6}$ alkoxy, and NO$_2$; and $R^2$ is selected from H, $C_{1-6}$ alkyl, $C_{2-6}$ alkenyl, $C_{3-7}$ cycloalkyl, $C_{6-10}$ aryl, carboxy, carbamyl, $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl.

In some embodiments, $R^1$ is selected from H, $C_{1-6}$ alkyl, $C_{6-10}$ aryl, and —NH—NH$_2$, where said $C_{6-10}$ aryl is optionally substituted with 1, 2, or 3 substituents independently selected from $C_{1-6}$ alkyl, hydroxyl, amino, $C_{1-6}$ alkoxy, and NO$_2$. In some embodiments, $R^1$ is H. In some embodiments, $R^1$ is —NH—NH$_2$. In some embodiments, $R^1$ is phenyl. In some embodiments, $R^1$ is selected from $C_{1-6}$ alkyl and $C_{6-10}$ aryl, where said $C_{6-10}$ aryl is optionally substituted with 1, 2, or 3 substituents independently selected from $C_{1-6}$ alkyl, hydroxyl, amino, $C_{1-6}$ alkoxy, and NO$_2$. In some embodiments, $R^1$ is $C_{1-6}$ alkyl. In some embodiments, $R^1$ is selected from $C_{1-6}$ alkyl and $C_{6-10}$ aryl, where said $C_{6-10}$ aryl is optionally substituted with 1, 2, or 3 substituents independently selected from $C_{1-6}$ alkyl, hydroxyl, amino, $C_{1-6}$ alkoxy, and NO$_2$. In some embodiments, $R^1$ is $C_{6-10}$ aryl, which is optionally substituted with 1, 2, or 3 independently selected $C_{1-6}$ alkyl groups. In some embodiments, $R^1$ is selected from $C_{6-10}$ aryl and —NH—NH$_2$, where said $C_{6-10}$ aryl is optionally substituted with 1, 2, or 3 substituents independently selected from $C_{1-6}$ alkyl and NO$_2$.

$R^2$ is selected from H, $C_{1-6}$ alkyl, carboxy, carbamyl, $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl. In some embodiments, $R^2$ is H. In some embodiments, $R^2$ is selected from carboxy, carbamyl, and aminosulfonyl. In some embodiments, $R^2$ is selected from H, carboxy, carbamyl, and aminosulfonyl. In some embodiments, $R^2$ is selected from $C_{1-6}$ alkylcarbamyl, di($C_{1-6}$-alkyl)carbamyl, $C_{1-6}$ alkylaminosulfonyl, and di($C_{1-6}$ alkyl)aminosulfonyl. In some embodiments, $R^2$ is carboxy. In some embodiments, $R^2$ is carbamyl. In some embodiments, $R^2$ is aminosulfonyl. In some embodiments, $R^2$ is selected from H, carboxy, carbamyl, and aminosulfonyl.

In some embodiments, $R^1$ is selected from $C_{1-6}$ alkyl and $C_{6-10}$ aryl, where said $C_{6-10}$ aryl is optionally substituted with 1, 2, or 3 substituents independently selected from $C_{1-6}$ alkyl, hydroxyl, amino, $C_{1-6}$ alkoxy, and NO$_2$; and $R^2$ is selected from H, carboxy, carbamyl, and aminosulfonyl.

In some embodiments, $R^1$ is $C_{1-6}$ alkyl and $R^2$ is H. In some embodiments, $R^1$ is $C_{6-10}$ aryl, which is optionally substituted with 1, 2, or 3 substituents independently selected $C_{1-6}$ alkyl groups; and $R^2$ is H.

In some embodiments, the compound of Formula (IIa) is a carbohydrazide (also known as 1,3-diaminourea, CAS Registry No. 497-18-7) having the following structure:

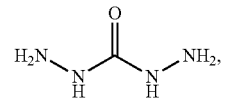

or a salt thereof.

In some embodiments, the compound of Formula (IIa) is selected from any one of the following compounds:

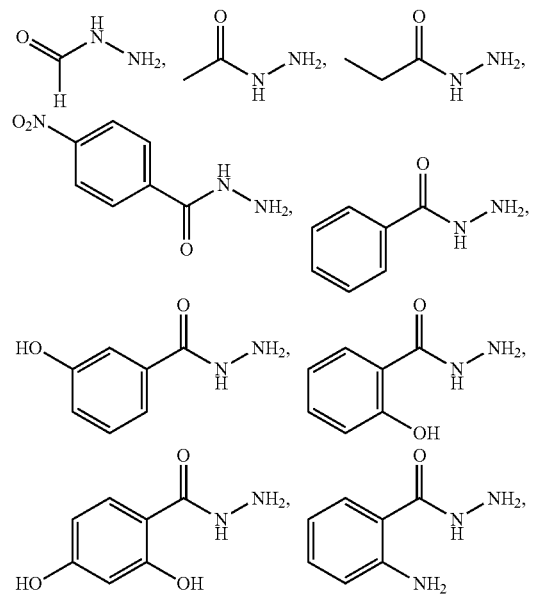

-continued

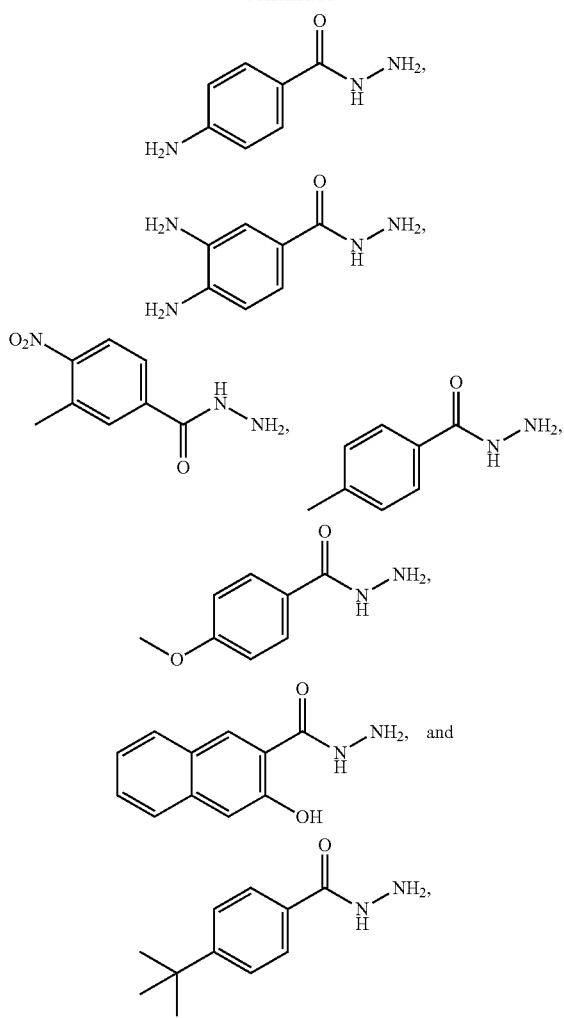

or a salt thereof.

In some embodiments, the compound of Formula (IIb) is a p-toluenesulfonyl hydrazide (also known as tosylhydrazide, CAS Registry No. 1576-35-8) having the following structure:

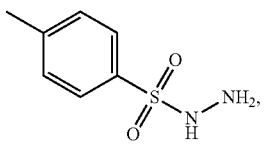

or a salt thereof.

In some embodiments, the compound of Formula (IIb) is selected from any one of the following compounds:

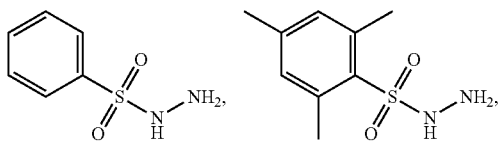

-continued

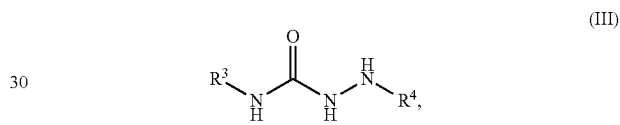

or a salt thereof.

In some embodiments, the hydrazide compound is selected from carbohydrazide and p-toluenesulfonyl hydrazide, or a salt thereof.

In some embodiments, the organic amine is a semicarbazide compound having Formula (III):

$$\text{(III)}$$

or a salt thereof, where:

$R^3$ is selected from H, $C_{1-6}$ alkyl, $C_{2-6}$ alkenyl, $C_{3-7}$ cycloalkyl, and $C_{6-10}$ aryl; and $R^4$ is selected from H, $C_{1-6}$ alkyl, $C_{2-6}$ alkenyl, $C_{3-7}$ cycloalkyl, $C_{6-10}$ aryl, carboxy, carbamyl, $C_{1-6}$ alkylcarbamyl, di($C_{1-6}$-alkyl)carbamyl, aminosulfonyl, $C_{1-6}$ alkylaminosulfonyl, di($C_{1-6}$ alkyl)aminosulfonyl, C(=O)$C_{1-6}$ alkyl, C(=O)$C_{6-10}$ aryl, S(=O)$_2C_{1-6}$ alkyl, and S(=O)$_2$ $C_{6-10}$ aryl;

where said $C_{6-10}$ aryl in $R^3$ or $R^4$ is optionally substituted with 1, 2, or 3 substituents independently selected from $C_{1-6}$ alkyl, hydroxyl, amino, $C_{1-6}$ alkoxy, and $NO_2$.

In some embodiments, $R^3$ is selected from H, $C_{1-6}$ alkyl, and $C_{6-10}$ aryl. In some embodiments, $R^3$ is H. In some embodiments, $R^3$ is $C_{1-6}$ alkyl. In some embodiments, $R^3$ is $C_{6-10}$ aryl optionally substituted with 1, 2, or 3 substituents selected from $C_{1-6}$ alkyl, hydroxyl, amino, $C_{1-6}$ alkoxy, and $NO_2$.

In some embodiments, $R^4$ is selected from H, $C_{1-6}$ alkyl, $C_{6-10}$ aryl, carboxy, carbamyl, C(=O)$C_{1-6}$ alkyl, C(=O) $C_{6-10}$ aryl, S(=O)$_2C_{1-6}$ alkyl, and S(=O)$_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^4$ is selected from H and $C_{1-6}$ alkyl. In some embodiments, $R^4$ is selected from $C_{1-6}$ alkylcarbamyl, di($C_{1-6}$-alkyl)carbamyl, aminosulfonyl, $C_{1-6}$ alkylaminosulfonyl, and di($C_{1-6}$ alkyl)aminosulfonyl. In some embodiments, $R^4$ is selected from carboxy, carbamyl, C(=O)$C_{1-6}$ alkyl, C(=O)$C_{6-10}$ aryl, S(=O)$_2C_{1-6}$ alkyl, and S(=O)$_2$ $C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^4$ is selected from carboxy and carbamyl. In some embodiments, $R^4$ is selected from $C(=O)C_{1-6}$ alkyl, $C(=O)C_{6-10}$ aryl, $S(=O)_2C_{1-6}$ alkyl, and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^4$ is selected from $C(=O)C_{6-10}$ aryl and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$. In some embodiments, $R^4$ is H. In some embodiments, $R^4$ is $C(=O)C_{1-6}$ alkyl. In some embodiments, $R^4$ is $C(=O)C_{6-10}$ aryl, where said $C_{6-10}$ aryl is optionally substituted with 1, 2, or 3 substituents independently selected from $C_{1-6}$ alkyl, hydroxyl, and $NO_2$. In some embodiments, $R^4$ is $S(=O)_2C_{1-6}$ alkyl. In some embodiments, $R^4$ is $S(=O)_2C_{6-10}$ aryl, where said $C_{6-10}$ aryl is optionally substituted with 1, 2, or 3 substituents independently selected from $C_{1-6}$ alkyl, hydroxyl, and $NO_2$. In some embodiments, $R^4$ is $S(=O)_2C_{6-10}$ aryl, where said $C_{6-10}$ aryl is optionally substituted with 1, 2, or 3 independently selected $C_{1-6}$ alkyl groups.

In some embodiments, $R^3$ is selected from H, $C_{1-6}$ alkyl, and $C_{6-10}$ aryl, and $R^4$ is selected from H, $C_{1-6}$ alkyl, carboxy, carbamyl, $C(=O)C_{1-6}$ alkyl, $C(=O)C_{6-10}$ aryl, $S(=O)_2C_{1-6}$ alkyl, and $S(=O)_2C_{6-10}$ aryl.

In some embodiments, $R^3$ is selected from H, $C_{1-6}$ alkyl, and $C_{6-10}$ aryl, and $R^4$ is selected from carboxy, carbamyl, $C(=O)C_{1-6}$ alkyl, $C(=O)C_{6-10}$ aryl, $S(=O)_2C_{1-6}$ alkyl, and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$.

In some embodiments, $R^3$ is selected from H, $C_{1-6}$ alkyl, and $C_{6-10}$ aryl, and $R^4$ is selected from $C(=O)C_{1-6}$ alkyl, $C(=O)C_{6-10}$ aryl, $S(=O)_2C_{1-6}$ alkyl, and $S(=O)_2C_{6-10}$ aryl; where said $C_{6-10}$ aryl is optionally substituted with 1, 2, or 3 substituents independently selected from $C_{1-6}$ alkyl, hydroxyl, amino, $C_{1-6}$ alkoxy, and $NO_2$.

In some embodiments, $R^3$ is selected from H and $C_{1-6}$ alkyl, and $R^4$ is $S(=O)_2C_{6-10}$ aryl, where said $C_{6-10}$ aryl is optionally substituted with 1, 2, or 3 independently selected $C_{1-6}$ alkyl groups.

In some embodiments, the compound of Formula (III) is a hydrazinecarboxamide (also known as aminourea or semicarbazide CAS Registry No. 57-56-7) having the following structure:

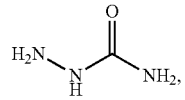

or a salt thereof.

In some embodiments, the compound of Formula (III) is a p-toluenesulfonyl semicarbazide (also known as tosylsemicarbazide, CAS Registry No. 10396-10-8) having the following structure:

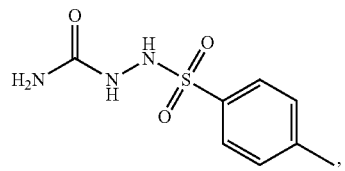

or a salt thereof.

In some embodiments, the compound of Formula (III) is selected from any one of the following compounds:

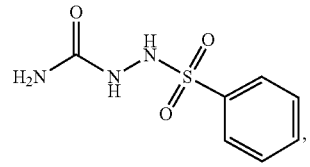

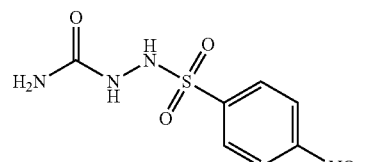

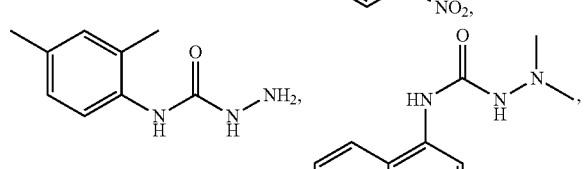

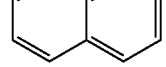

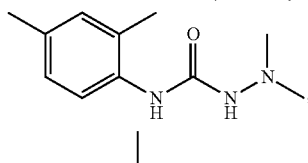

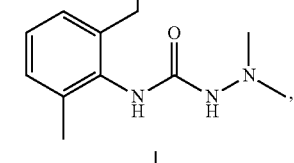

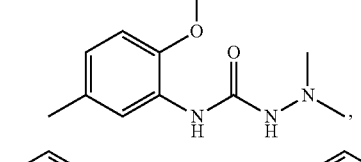

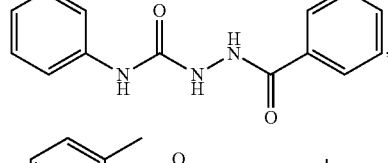

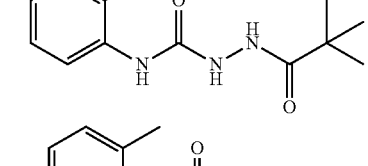

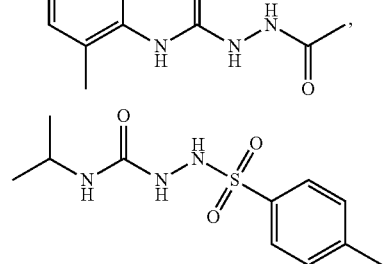

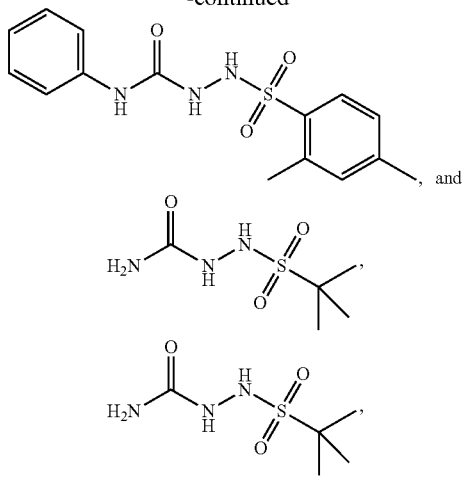

or a salt thereof.

An organic amine compound in the gas-generating composition of the present disclosure may catalyze the gas-generating decomposition reaction of the azo compound. Without being bound to any particular theory, it is believed that an amine compound non-covalently binds to a carbonyl group of the azo compound, and thereby decreases the activation energy of the radical decomposition reaction of the azo compound. That is, an amine compound serves as a catalyst and induces decomposition of the azo compound and production of the diimide compound, which, it turn, further decomposes to yield nitrogen gas and hydrogen gas. Examples of non-covalent interactions of amine compounds and azo compounds include hydrogen bonds, Van-der-Waals forces, electrostatic attractions, and hydrophobic interactions. In some embodiments, an amine compound also catalyzes the decomposition reaction of the diimide compound and subsequent $N_2$ and $H_2$ gas generation. In some embodiments, addition of an amine compound to the azo compound-containing composition decreases the decomposition temperature of the azo compound by a factor of 0.5 in terms of Celsius. That is, if an azo compound decomposes to produce gas at about 200° C. in the absence of an amine, then in the presence of the amine the azo compound decomposes at about 100° C. In some embodiments, addition of an organic amine decreases the decomposition temperature of the azo compound by a factor of about 0.6 in terms of Celsius, about 0.7 in terms of Celsius, about 0.8 in terms of Celsius, about 0.9 in terms of Celsius, or about 0.95 in terms of Celsius.

Typically, an organic amine compound is present in the aqueous composition in 1:1 molar ratio with the azo compound. In some embodiments, an organic amine compound is present in the gas-generating composition in molar excess with respect to the azo compound. For example, the organic amine compound may be present in about 10:1, about 8:1, about 5:1, about 3:1, about 2:1, or about 3:2 molar excess with respect to the azo compound. In some embodiments, the composition contains from about 0.5 wt. % to about 25 wt. %, from about 1 wt. % to about 20 wt. %, from about 1 wt. % to about 10 wt. %, from about 1 wt. % to about 5 wt. %, from about 3 wt. % to about 5 wt. %, from about 2 wt. % to about 18 wt. %, or from about 3 wt. % to about 15 wt. % of the amine compound based on the weight of the composition. In some embodiments, the aqueous composition contains about 0.5 wt. %, about 1 wt. %, about 2 wt. %, about 3 wt. %, about 3.5 wt. %, about 4 wt. %, about 4.5 wt. %, about 5 wt. %, about 7.5 wt. %, about 10 wt. %, about 15 wt. %, or about 20 wt. % of the organic amine compound based on the weight of the aqueous composition.

Examples of Oxidizing Compounds

In some embodiments, an aqueous gas-generating composition of the present disclosure may be admixed with an oxidizing compound. In some embodiments, the oxidizing compound is inorganic. Suitable examples of inorganic oxidizes include hydrogen peroxide, sodium hypochlorite, calcium hypochlorite, peroxysulfate, peroxycarbonate, peroxyborate, and peroxides of alkali and alkaline earth metals (for example, sodium peroxide, potassium peroxide, or calcium peroxide). In some embodiments, the oxidizing compound is organic, for example, water soluble or water dispersible peracids, peroxides and hydroperoxides (for example, peracetic acid, benzoyl peroxide and t-butyl hydrogen peroxide).

In some embodiments, oxidizing compound is selected from a peroxysulfate, a peroxycarbonate, or a peroxyborate of alkali and alkaline earth metals, a peroxide (for example, alkali metal peroxide, alkali earth metal peroxide, benzoyl peroxide or t-butyl hydrogen peroxide), a hypochlorite (for example, sodium hypochlorite or calcium hypochlorite), and an organic peracid (for example, peracetic acid).

Typically, an oxidizing compound is present in a wellbore fluid in about 1:1 molar ratio with the azo compound. In some embodiments, an oxidizing compound is present in the wellbore fluid in molar excess with respect to the azo compound. For example, the oxidizer compound may be present in about 10:1, about 8:1, about 5:1, about 3:1, about 2:1, or about 1.5:1 molar excess with respect to the azo compound. In other embodiments, the azo compound is present in molar excess with respect to the oxidizer, for example, azo compound is present in a wellbore fluid in about 10:1, about 8:1, about 5:1, about 3:1, about 2:1, or about 1.5:1 molar excess with respect to the oxidizer.

In some embodiments, addition of the oxidizer compound to a wellbore fluid increases the amount of gaseous compounds produced upon activation of the gas-generating compound, for example, by converting the inactive reduced form of the gas-generating compound to the active form. An example of this process as applied to the azo compounds is shown in Scheme 4.

Examples of Combinations of Ingredients and Properties of the Compositions

In some embodiments, a gas-generating aqueous composition contains an azo compound in an amount from about 1 wt. % to about 10 wt. %, and an organic amine in an amount from about 1 wt. % to about 10 wt. % based on the weight of the composition.

In some embodiments, a gas-generating aqueous composition contains azodicarbonamide in an amount from about 1 wt. % to about 10 wt. %, and carbohydrazide in an amount from about 1 wt. % to about 10 wt. %.

In some embodiments, a gas-generating aqueous composition contains azodicarbonamide in an amount from about 1 wt. % to about 10 wt. %, and p-toluenesulfonyl semicarbazide in an amount from about 1 wt. % to about 10 wt. %.

In some embodiments, a gas-generating aqueous composition contains azodicarbonamide in an amount from about 1 wt. % to about 10 wt. %, and ethylene diamine in an amount from about 1 wt. % to about 10 wt. %.

In some embodiments, a gas-generating aqueous composition contains azodicarbonamide in an amount from about 1 wt. % to about 10 wt. %, and triethanolamine in an amount from about 1 wt. % to about 10 wt. %.

In some embodiments, a gas-generating aqueous composition contains azodicarbonamide in an amount from about 1 wt. % to about 10 wt. %, and tetraethylene pentamine (TEPA) in an amount from about 1 wt. % to about 10 wt. %.

In any of the aforementioned embodiments, azodicarbonamide may be present in an amount from about 3 wt. % to about 5 wt. %, and any of the organic amines may be present in an amount forma bout 1 wt. % to about 5 wt. %.

In some aspects of the aforementioned embodiments, the composition contains a viscosifier in an amount from about 0.1 wt. % to about 1 wt. % based on the weight of the composition (for example, about 0.5 wt. % or about 0.8 wt. %). In these aspects, the viscosifier may be xanthan, diutan or vinylphosphonate-grafted hydroxycellulose (HEC).

In some aspects of the aforementioned embodiments, the composition contains a foaming surfactant or a foam-stabilizing surfactant in an amount from about 1 wt. % to about 5 wt. % based on the weight of the aqueous composition (for example, sodium lauryl sulfate and/or hydroxysultaine surfactants).

In yet other aspects of the aforementioned embodiments, pH composition of the composition is less than about 9, less than about 8, less than about 7, less than about 6, less than about 5, less than about 4, less than about 3, less than about 2, or less than about 1. For example, pH of the aqueous composition is from about 1 to about 9, from about 2 to about 9, from about 3 to about 9, from about 4 to about 9, from about 5 to about 9, from about 6 to about 8, or from about 6 to about 7.

Examples of Viscosifiers

In some embodiments, an aqueous gas-generating composition of the present disclosure contains a viscosifier. In some embodiments, a viscosifier is a clay, a surfactant, a synthetic polymer, or a biopolymer. In some embodiments, the viscosifier is a bentonite, laponite, attapulgite, sepiolite, phyllosilicate, silica, or an organophilic clay. In some embodiments, the viscosifier is a water-soluble polyacrylate, a polyurethane, a polyether, a polymethacrylate, an acrylamide based polymer, sulfonated polystyrene (SPS), polyamine, polyamide, polyglycol, polyvinylacetate or polydiallyldimethylammonium chloride (polyDADMAC). In some embodiments, the viscosifier is a biobased polymer selected from starch, crosslinked starch, or cellulose (including its derivatives). In some embodiments, the viscosifier is an alkylated cellulose or a hydroxyalkylated cellulose, for example, methylcellulose, ethylcellulose, hydroxyethyl cellulose, hydroxypropyl methylcellulose, or vinylphosphonate grafted hydroxyethylcellulose (HEC). The viscosifier can include a substituted or unsubstituted polysaccharide selected from diutan, xanthan, and xylinan. In some embodiments, the viscosifier is diutan. In some embodiments, the viscosifier is xanthan. In some embodiments, the polymer is a vinyl phosphonated hydroxyethyl cellulose.

Viscosifier gives the aqueous gas-generating composition its basic rheological properties, modulates the viscosity of the composition and provides shear-rate (for example, low shear rate) viscosity and weight-material suspension. In addition, some of the gas-generating compounds described here (for example, azo compounds) are sparingly water-soluble, and precipitate quickly after mixing with water. Addition of the viscosifier to the composition suspends the gas-generating compound in water and allows to store the composition for prolonged periods of time without settling.

In some embodiments, the composition contains from about 0.1 wt. % to about 10 wt. %, from about 0.2 wt. % to about 9 wt. %, from about 0.3 wt. % to about 8 wt. %, from about 0.5 wt. % to about 5 wt. %, or from about 0.1 wt. % to about 1 wt. % of the viscosifier based on the weight the aqueous composition. In some embodiments, the aqueous composition contains about 0.1 wt. %, about 0.2 wt. %, about 0.3 wt. %, about 0.5 wt. %, about 0.6 wt. %, about 0.8 wt. %, about 1 wt. %, about 1.5 wt. %, about 2 wt. %, about 2.5 wt. %, about 3 wt. %, about 3.5 wt. %, or about 5 wt. % of the viscosifier.

In some embodiments, viscosity of the aqueous composition is from about 1 cP to about 1000 cP, from about 5 cP to about 500 cP, from about 10 cP to about 300 cP, or from about 20 cP to about 200 cP. In some embodiments, viscosity of the composition is from about 5 cP to about 500 cP.

In some embodiments, the aqueous composition is a clear solution. In some embodiments, the aqueous composition is a suspension. In these embodiments, the suspension may contain particles of a solid material, for example, azodicarbonamide, with an average diameter from about 10 nm to about 100 μm, or from about 1 μm to about 10 μm (for example, about 1 μm, about 2 μm, about 3 μm, about 5 μm, or about 10 μm). In some embodiments, the solid material in the suspension does not settle (precipitate) for a prolonged period of time (for example, about 1 hour, about 5 hours, about 12 hours, about 24 hours, about 48 hours, about 2 days, about 5 days, or about 1 week or longer).

Examples of Foaming or Foam Stabilizing Surfactants

In some embodiments, an aqueous gas-generating composition of the present disclosure includes a water soluble foaming surfactant. As used here, the term "foaming surfactant" includes foam stabilizing surfactants that are soluble in water.

In some embodiments, foaming surfactant is negatively charged (for example, anionic surfactant). In other embodiments, foaming surfactant is positively charged (for example, cationic surfactant). In some embodiments, foaming surfactant is neutral. In some aspects of these embodiments, foaming surfactant is zwitterionic (having a positive and a negative electrical charge so that the net charge of the entire molecule of the surfactant is zero). Suitable foaming surfactants include polymeric surfactants, block copolymer surfactants, di-block polymer surfactants, hydrophobically modified hydrophilic polymer surfactants, fluoro-surfactants, and surfactants containing a non-ionic spacer-arm central extension and an ionic or nonionic polar group. In some examples, the non-ionic spacer-arm central extension can be the result of at least one of polypropoxylation and polyethoxylation (PEGylation).

Suitable examples of non-ionic surfactants include polyoxyethylene alkyl ethers, polyoxyethylene alkylphenol ethers, polyoxyethylene lauryl ethers, polyoxyethylene sorbitan monooleates, polyoxyethylene alkyl esters, polyoxyethylene sorbitan alkyl esters, ethoxylated trimethylnonanols, and polyoxyalkylene glycol modified polysiloxane surfactants. Other suitable examples of non-ionic surfactants include PEGylated long chain fatty alcohols or fatty acids, for example, a $C_{12-16}$ alcohol, PEGylated alkyl amine or an amide, co-polymerization products of ethylene oxide and propylene oxide, fatty esters of glycerol, sucrose, or sorbitol, alkylated fatty acid amides, fatty amine oxides, polyoxyalkylene alkyl ethers like polyethylene glycol long chain alkyl ether, polyoxyalkylene sorbitan ethers, polyoxyalkylene alkoxylate esters, polyoxyalkylene alkylphenol ethers, alkylated polysaccharides, and polyvinylmethylether. In certain embodiments, the non-ionic surfactant is a polyoxyethylene fatty alcohol or mixture of polyoxyethylene fatty alcohols.

Suitable examples of anionic surfactants include $C_{8-30}$ alkyl sulfates (for example, lauryl sulfate), $C_{10-30}$ alkyl acrylates, alkylbenzenesulfonic acids (for example, hexylbenzenesulfonic acid, octylbenzenesulfonic acid, decylbenzenesulfonic acid, dodecylbenzenesulfonic acid, cetylbenzenesulfonic acid or myristylbenzene sulfonic acid), sulfate esters of monoalkyl polyoxyethylene ethers, alkylnapthylsulfonic acid; sodium lauryl sulfate and its salts, sulfonated glyceryl esters of fatty acids like sulfonated monoglycerides of coconut oil acids, sodium octahydroanthracene sulfonate. For any of the anionic surfactant described here, the counterion can be any suitable counterion, for example, $H^+$, $Na^+$, $K^+$, $Li^+$, $Zn^{2+}$, $NH^{4+}$, $Ca^{2+}$, $Mg^{2+}$, $Zn^{2+}$, or $Al^{3+}$.

Suitable cationic surfactants can include at least one of an arginine methyl ester, an alkanolamine, an alkylenediamine, an amine oxide, an alkylamine oxide, an ethoxylated amide, an ethoxylated fatty amine, an ethoxylated alkyl amine, an alkyl betaine, an alkylamidobetaine, and a surfactant containing a quaternary ammonium group. Suitable examples of cationic surfactants include quaternary ammonium hydroxides (for example, octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide or coco trimethyl ammonium hydroxide), fatty amines, fatty acid amides, basic pyridinium compounds, and quaternary ammonium bases of benzimidazolines, polyethoxylated amines, and polypropoxylated amines.

Some examples of foaming surfactants include sorbitan monooleate, polyglycol-modified trimethsilylated silicate, cetyltrimethylammonium chloride, an ethoxylated nonyl phenol phosphate ester, a $C_{12-22}$ alkyl phosphonate, a sulfonate methyl ester, a hydrolyzed keratin, a polyoxyethylene sorbitan monopalmitate, a polyoxyethylene sorbitan monostearate, a polyoxyethylene sorbitan monooleate, a linear alcohol alkoxylate, an alkyl ether sulfate, a linear nonylphenol, polyethylene glycol, an ethoxylated castor oil, dipalmitoyl-phosphatidylcholine, sodium 4-(heptylnonyl) benzenesulfonate, polyoxyethylene nonyl phenyl ether, sodium dioctyl sulfosuccinate, tetraethyleneglycoldodecylether, sodium octylbenzenesulfonate, sodium hexadecyl sulfate, sodium laureth sulfate, decylamine oxide, dodecyl betaine, dodecylamine oxide, N,N,N-trimethyl-1-octadecaammonium chloride, xylene sulfonate, sodium dodecyl sulfate, cetyltrimethylammonium bromide, cocoamidopropyl betaine, cocoamidopropyl dimethylamine oxide.

Examples of foaming surfactants also include $C_{5-50}$ hydrocarbylsulfates, $C_{5-50}$ hydrocarbylsulfate $C_{1-20}$ hydrocarbyl esters, where the $C_{1-20}$ hydrocarbyl is $C_{1-20}$ alkyl or $C_{2-20}$ alkenyl, $C_{5-20}$ alkylsulfate, a $C_{5-20}$ alkylsulfate $C_{1-20}$ alkyl esters, and $C_{5-20}$ alkylbisulfates.

In some embodiments, the foaming surfactant is a $C_{1-10}$ hydrocarbylamido $C_{1-5}$ alkylbetaine (for example, lauramidopropyl betaine). In some embodiments, the foaming surfactant is a $C_{1-10}$ hydrocarbylamido $C_{1-5}$ alkyldimethylamine oxide (for example, lauramidopropyl dimethylamine oxide).

In some embodiments, the foaming surfactant contains a hydroxy sulfobetaine group (also known as hydroxysultaine group). In some embodiments, the foaming surfactant is $C_{5-25}$ alkyl or $C_{5-25}$ alkenyl amidopropyl hydroxysultaine (for example, lauramidopropyl hydroxysultaine, cocamidopropyl hydroxysultaine, oleamidopropyl hydroxysultaine, tallowamidopropyl hydroxysultaine, or erucamidopropyl hydroxysultaine). In some embodiments, the foaming surfactant is $C_{8-16}$ alkyl hydroxy sulfobetaine or $C_{8-16}$ alkenyl hydroxy sulfobetaine. Suitable examples of these surfactants include didodecylmethyl hydroxyl sulfobetaine, lauryl hydroxysultaine, and octadecyl hydroxy sulfobetaine.

In some embodiment, the foaming surfactant is advantageously insensitive to the storing conditions of the gas-generating fluid and does not lose its properties due to the presence of salts in the fluid and to temperature of the fluid. In some embodiments, the foaming surfactant is resistant to degradation by oxidizing agents like sodium hypochlorite.

Foaming surfactant facilitates formation of foam (increase in volume) in the composition when the gas-generating compound is activated and produces gas (for example, $N_2$). A foaming surfactant reduces surface tension of water in the composition and promotes formation of the foam bubbles filled with the gas that is being generated. Without being bound to a particular theory, it is believed that formation of foam bubbles enhances variable density and compressibility of the fluid to which a gas-generating composition of the present disclosure is added and in which the gas is generated.

In some embodiments, the aqueous composition contains from about 1 wt. % to about 50 wt. %, from about 1 wt. % to about 40 wt. %, from about 1 wt. % to about 30 wt. %, from about 1 wt. % to about 25 wt. %, from about 1 wt. % to about 20 wt. %, from about 1 wt. % to about 15 wt. %, from about 2 wt. % to about 20 wt. %, from about 3 wt. % to about 20 wt. %, from about 4 wt. % to about 15 wt. %, or from about 5 wt. % to about 15 wt. % based on the weight of the aqueous composition. In some embodiments, the aqueous composition contains about 1 wt. %, about 2 wt. %, about 3 wt. %, about 4 wt. %, about 5 wt. %, about 10 wt. %, or about 15 wt. %.

In some embodiments, density of the composition is in the range of about 70 pounds per cubic foot (pcf) to about 150 pcf, about 20 pcf to about 250 pcf, or about 50 pcf to about 150 pcf. For example, the density of the composition is about 20 pcf, about 30 pcf, about 40 pcf, about 50 pcf, about 70 pcf, about 85 pcf, about 100 pcf, about 120 pcf, about 150 pcf, or about 200 pcf.

Examples of Additional Ingredients

In some embodiments, an aqueous gas-generating composition of the present application also contains at least one additional component. It is understood by one skilled in the art that an additive may be classified under more than one category. For example, sodium hydrogen phosphate may be considered as salt of a weak acid, namely phosphoric acid and a strong base, namely sodium hydroxide. It is also a buffer, because it has both acid and base components that can function as a buffering agent. The same compound can also function as a calcium precipitating agent, since calcium phosphate that is formed in the reaction between calcium hydroxide or calcium silicate, both of which are components of set cement and sodium hydrogen phosphate, is insoluble in water. Similarly, citric acid and an organic base (for example, ethanolamine), or an inorganic base (for example, sodium hydroxide or sodium phosphate) forms a buffer system that contains partially neutralized citric acid. The resulting citrate salt is a calcium chelating agent as well as calcium precipitating agent while functioning as a component of the buffer system.

In some embodiments, the aqueous composition includes an inorganic salt. The salt can be about 1% to about 10% by weight of the composition. The salt can be selected from NaCl, NaBr, KCl, KBr, $NaHCO_3$, $Na_2CO_3$, $CaCl_2$, $MgCl_2$, $NaNO_3$, $KNO_3$, $NaC_2H_3O_2$, $KC_2H_3O_2$, $NaCHO_2$, $KCHO_2$, or any combinations thereof. For example, the salt can be selected from the group consisting of NaCl, KCl, and combinations thereof.

The aqueous composition may include a formate salt. Suitable examples of formates include at least one alkali metal formate like sodium formate or potassium formate. Other suitable formates may also be included. In some embodiments, the aqueous composition contains at least two formates. An amount of the formate or a combination of the formates in the aqueous composition may range from about 1 wt. % to about 20 wt. %, about 5 wt. % to about 15 wt. %, or about 10 wt. % to about 15 wt. %. For example, the slurry may contain about 1 wt. %, about 10 wt. %, about 15 wt. %, or about 20 wt. % of a formate or combination of formates.

An amount of an optional additional component in the composition, for example, an inorganic salt, a formate salt, a buffering agent or a chelating agent, an ultra-fine particulate inorganic material or any combination thereof, may vary from about 0.1 wt. % to about 30 wt. %, or from about 0.5 wt. % to about 20 wt. % based on the weight of the aqueous composition. The composition may also include an ash, for example, a soda ash, and a bicarbonate, for example, sodium bicarbonate.

Salts of Acidic and Basic Compounds

In some embodiments, a salt of a compound of any one of the formulas disclosed here (for example, azo compound, hydrazide compound, semicarbazide compound, amine compound, hydrazine compound, ethyleneimine derived compounds, or a polyethyleneimine) is formed between an acid and a basic group of the compound, for example, an amino functional group, or a base and an acidic group of the compound, for example, a carboxyl functional group. According to another embodiment, the salt of the compound is an acid addition salt, or a base addition salt.

In some embodiments, acids commonly employed to form salts of the compounds of any one of the formulas disclosed here include inorganic acids, for example, hydrochloric acid, sulfuric acid and phosphoric acid. Alternatively or in addition, the acids include organic acids, for example, p-toluenesulfonic acid, salicylic acid, tartaric acid, bitartaric acid, ascorbic acid, maleic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such salts can include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, formate, isobutyrate, caprate, heptanoate, propiolate, oxalate, malonate, succinate, suberate, sebacate, fumarate, maleate, butyne-1, 4-dioate, hexyne-1,6-dioate, benzoate, chlorobenzoate, methylbenzoate, hydroxybenzoate, methoxybenzoate, phthalate, terephthalate, sulfonate, xylene sulfonate, phenylacetate, phenylpropionate, phenylbutyrate, citrate, lactate, β-hydroxybutyrate, glycolate, maleate, tartrate, methanesulfonate, propanesulfonate, naphthalene-1-sulfonate, naphthalene-2-sulfonate, mandelate and other salts. In one embodiment, acid addition salts include those formed with mineral acids, for example, hydrochloric acid and sulfuric acid, and those formed with organic acids, for example, acetic acid.

In some embodiments, bases commonly employed to form salts of the compounds of any one of the formulas disclosed here include hydroxides of alkali metals, including sodium, potassium, and lithium; hydroxides of alkaline earth metals, for example, calcium and magnesium; hydroxides of other metals, for example, aluminum and zinc; ammonia, organic amines, for example, unsubstituted or hydroxyl-substituted mono-, di-, or tri-alkylamines, dicyclohexylamine; tributyl amine; pyridine; N-methyl, N-ethylamine; diethylamine; triethylamine; mono-, bis-, or tris-(2-OH—$C_{1-6}$ alkyl amine), for example, N,N-dimethyl-N-(2-hydroxyethyl)amine or tri-(2-hydroxyethyl)amine; N-methyl-D-glucamine; morpholine; thiomorpholine; piperidine; pyrrolidine; and amino acids, for example, arginine, lysine, and the like.

Methods of Making

Any composition described here may be readily prepared by a skilled engineer using methods and apparatuses generally known in chemical engineering for mixing, suspending and dissolving organic chemicals in an aqueous solvent. For example, a round-bottom mixing tank, a cone bottom mixing tank, or a flat bottom chemical mixing tank. A chemical engineer will also be able to choose tools and instruments for quality control measurements, for example, monitoring pH, viscosity, density and also sedimentation and generation of bubbles of gas in the composition.

In some embodiments, preparation of a gas-generating composition includes adding an organic amine compound to an aqueous solution, adding a gas-generation compound to the resultant composition, and, if necessary, adding an acid or base to adjust pH of the composition to a desired value (for example, pH of about 6 or about 7). In some aspects of these embodiments, the aqueous solution contains a viscosifier or a foaming surfactant, or both.

In some embodiments, preparation of a gas-generating composition includes adding an organic amine compound and a gas generating compound (simultaneously or sequentially) to an aqueous solution, and adjusting pH of the resultant composition to a desired value. In some embodiments, preparation of a gas-generating composition includes adding a gas-generating compound to an aqueous solution, adding an acid or base to adjust pH of the composition to a desired value, adding amine compound to the resultant composition, and, if necessary, adding an additional amount of acid or base to adjust pH of the composition to the desired value. In some aspects of the foregoing embodiments, aqueous solution contains a viscosifier or a foaming surfactant, or both.

In some embodiments, an oxidizer may be admixed with the gas-generating composition in a wellbore fluid. In these embodiments, the oxidizer may be added to the composition immediately before using the composition in downhole operations. In one example, the oxidizing agent is added to the wellbore treatment fluid either before or after adding the gas generating aqueous composition to the treatment fluid.

Methods of Using

Production of a recoverable fluid from a subterranean formation often requires drilling into the subterranean formation to produce a wellbore through which the recoverable fluid is brought to the surface. A drilling fluid is used to aid the drilling of the well by creating hydrostatic pressure to prevent formation fluid from entering into the well prematurely, keeping the drill bit cool, and suspending the drill cuttings and carrying them to the surface. Conventional drilling fluids having constant density are generally uncompressible and exert a constant hydrostatic pressure against the wellbore walls. Because of this, when conventional fluid is used for drilling, sudden changes in formation type and formation strength may lead to "kicks" (unexpected formation fluid influxes to the well), collapse of the bore by pressured formation fluids, and loss of circulation of the drilling fluid into a particularly weak formation. Drilling fluid left behind a casing may also lead to sustained casing pressure (SCP) or annular pressure build up (APB) due to thermal expansion of residual drilling fluid left behind casing, making the casing susceptible to collapse. However, in case of a drilling fluid having significant compressibility, density of the fluid and hydrostatic pressure exerted by the fluid against the formation may vary depending on the strength of the formation. For instance, the effective density of drilling fluid and hydrostatic pressure against the wall may increase when the drill bit is cutting through a strong and hard formation. Similarly, effective density of the drilling fluid and concomitantly hydrostatic pressure against the wellbore wall may decrease as the drilling occurs in the weaker part of the formation and avoid collapse of the bore or loss of drilling fluid to the formation, or both.

In a general aspect, the present application provides a method of using an aqueous gas-generating composition of the present disclosure to modulate density of wellbore fluids. In some embodiments, the method includes adding the aqueous gas-generating composition to a wellbore fluid to obtain a wellbore fluid with variable density. In some embodiments, volume ratio of the aqueous gas-generating composition to the wellbore fluid is from about 10:1 to about 1:10, from about 8:1 to about 1:8, from about 5:1 to about 1:5, from about 3:1 to about 1:3, from about 2:1 to about 1:2, or from about 1:1 to about 1:2. In some embodiments, volume ratio of the aqueous gas-generating composition to the wellbore fluid is about 5:1, about 3:1, about 2:1, about 3:2, about 1:1, about 2:3, about 1:2, about 1:3, or about 1:5.

In some embodiments, an amount of gas-generating compound (for example, azo compound) in the wellbore fluid with variable density is from about 0.1 wt. % to about 10 wt. %, from about 0.2 wt. % to about 8 wt. %, from about 0.5 wt. % to about 5 wt. %, from about 1 wt. % to about 4 wt. %, or from about 1 wt. % to about 3 wt. % based on the weight of the wellbore fluid. In some embodiments, an amount of gas-generating compound in wellbore fluid with variable density is about 0.5 wt. %, about 1 wt. %, about 1.5 wt. %, about 2 wt. %, about 3 wt. %, about 4 wt. %, or about 5 wt. % based on the weight of the wellbore fluid.

In some embodiments, an amount of foaming surfactant is the wellbore fluid with variable density is from about 1 wt. % to about 20 wt. %, from about 2 wt. % to about 15 wt. %, or from about 5 wt. % to about 10 wt. % based on the weight of the wellbore fluid. In some embodiments, an amount of foaming surfactant is the wellbore fluid with variable density is about 3 wt. %, about 5 wt. %, about 6 wt. %, about 8 wt. %, about 10 wt. %, about 12 wt. %, or about 15 wt. % based on the weight of the wellbore fluid.

In some embodiments, adding the gas-generating composition to the wellbore fluid, for example, a cement slurry, drilling fluid, stimulation fluid, clean-up fluid, fracturing fluid, completion fluid, remedial treatment fluid, cementing fluid, or carrier fluid, increases compressibility of the fluid. In some embodiments, increased compressibility leads to variable density of the fluid. In some embodiments, variable density of a wellbore fluid leads to wellbore stability and smooth operation. Wellbore fluids with variable density and increased compressibility include drilling fluids, carrier fluids, fracturing fluids, spotting fluids, cementing fluids, completion fluids, stimulation fluids, remedial fluids and clean-up fluids.

In some embodiments, variable density is achieved by activating a gas generating compound in the wellbore fluid to produce gaseous compounds (for example, bubbles of gas). Without being bound to any particular theory, it is believed that gases are more compressible than pure liquids. Hence, when bubbles of gas are dispersed in the liquid carrier, the resultant composition is more compressible than the pure liquid carrier without any gas dispersed in it.

In some embodiments, the gas-generating compound in the wellbore fluid may be activated by temperature in the wellbore (for example, any temperature in the wellbore greater than 100° C.). In some embodiments, the gas generating compound in the wellbore fluid may be activated by basic pH (for example, a pH of about 7.5, about 8, about 9, about 10, about 11, or about 12). For example, a gas-generating compound may be activated to produce gas when an aqueous gas-generating composition is added to a wellbore fluid having pH of about 12, and the resultant wellbore fluid containing the gas-generating compound has pH of about 5, about 6, about 7, about 9, or greater. In some embodiments, a solution of a base, for example, NaOH may be added to the wellbore fluid consecutively or concurrently with the aqueous gas-generating composition to achieve the desired pH value in the wellbore fluid (for example, a pH of about 5, about 6, about 7, about 9, about 11, or about 12). In some embodiments, aqueous gas-generating composition as described earlier may be prepared beforehand and safely stored before application (for example, the gas-generating composition may be produced at a dedicated production facility and transported to the wellbore site for application). In other embodiments, a gas-generating composition may be prepared immediately before application, for example, by a mud engineer, from the individual components. In some embodiments, an oxidizing compound may be added to the wellbore fluid consecutively or concurrently with the aqueous gas-generating composition. In some embodiments an oxidizing compound may be added to the aqueous gas-generating composition immediately before admixing the composition with the wellbore fluid. In such embodiments, the gas generating composition and the oxidizing compound may be stored or transported to the wellbore application site separately. In some embodiments, an aqueous gas-generating compound is admixed with the wellbore fluid at the application site, for example, using a mixer tank. In some embodiments, a liquid injection pump is utilized to inject the gas-generating composition into a wellbore treatment fluid on-the-fly in a continuous operation. In some embodiments, an oxidizer compound is batch mixed with the gas-generating composition or with the wellbore fluid on site. In some embodiments, the oxidizing compound is injected downhole using a liquid injection pump. In some embodiments, the gas generation is activated by any of the aforementioned activation factors, or any combination thereof. In some embodiments, gas generation is activated by pH of the wellbore fluid greater than than 5 (for example, pH greater than 6, greater than 7, or greater than 8) and by temperature in the wellbore greater than than 100° C.

The methods described earlier advantageously allow for introducing an amount of gas to the wellbore fluid. In some embodiments, volume fraction of gas in the wellbore fluid generated by the present composition is from about 0.1 v/v % to about 50 v/v %, from about 1 v/v % to about 25 v/v %, or from about 1 v/v % to about 10 v/v % based on the amount of the wellbore fluid.

Controlled compressibility may be also desired in wellbore set cement applications. In primary cementing, inclusion of an amount of gas in the cement mixture may be advantageous for improved resiliency and reduced brittleness of set cement. In one aspect, the present application provides a method of using an aqueous gas-generating composition of the present disclosure to modulate density of set cement. In some embodiments, the method includes adding an aqueous gas-generating composition to the cement mixture prior to pumping the cement mixture downhole. In some embodiments, the method includes injecting the aqueous gas-generating composition downhole to mix with the cementing mixture. In some embodiments, the gas-generating compound is activated before the cement sets. In such embodiments the set cement includes bubbles of gas. Without being bound to any particular theory, it is believed that bubbles of gas in set cement provide increased compressibility to the cement. This is advantageous, because in an event of sudden pressure increase, set cement will not collapse but rather compress the bubbles of gas in the cement material in an elastic manner.

EXAMPLES

Materials and General Methods

Aqueous solutions xanthan, diutan and vinylphosphonate-grafted hydroxycellulose (HEC) were employed as simulated wellbore fluids. Sodium dodecyl sulfate (sodium lauryl sulfate) and hydroxysulfobetaine (aqueous solution) were employed as representative foaming surfactants.

Example 1

1.5 g of azodicarbonamide solid were added to 50 milliliters of 0.8% xanthan solution and stirred vigorously for an hour to obtain a well-dispersed stable suspension. 10 ml (containing 0.3 g of azodicarbonamide) of the suspension was added to several graduated cylinders. Then, foaming surfactants and amine activators were added, as specified in Table 1. The suspension was stirred and the cylinders were kept in a water bath heated to 140° F. The initial fluid volume before measurements was 12 ml. The gas volumes were measured periodically. The results are shown in Table 1.

TABLE 1

| $A^1$ | $B^2$ | $C^3$ | $D^4$ | pH | $E^5$ | $F^6$ | $G^7$ | $H^8$ | Foam stability |
|---|---|---|---|---|---|---|---|---|---|
| None | 0.4 | Carbohydrazide | 0.3 g | 7.0 | 50 | 58 | 79 | 160 | Slightly heterogeneous bubble sizes |
| 0.15 | 0.4 | Carbohydrazide | 0.3 g | — | 55 | 58 | 79 | 160 | Stable, homogeneous bubbles |
| 0.15 | None | Carbohydrazide | 0.3 g | — | 58 | 28 | 62 | 32 | Unstable foam |
| None | 0.4 | Toluene sulfonyl semicarbazide | 0.5 g | 6.8 | 12 | 12 | 0 | 0 | No foam |
| 0.15 | 0.4 | Toluene sulfonyl semicarbazide | 0.5 g | — | 12 | 12 | 0 | 0 | |
| 0.15 | 0.4 ml | Toluene sulfonyl hydrazide | 0.45 g | — | 32 | 44 | 73 | 107 | |
| 0.15 | 0.4 | TEPA | 0.15 ml | — | 33 | 40 | 70 | 93 | |
| 0.15 | 0.4 | TEPA | 0.3 ml | — | 40 | 46 | 74 | 113 | |
| 0.15 | 0.4 | TEPA | 0.45 ml | — | 45 | 48 | 75 | 120 | |
| 0.15 | 0.4 | Ethylene diamine | 0.3 ml | — | 56 | 63 | 81 | 170 | |
| 0.15 | 0.4 | Triethanolamine | 0.4 ml | — | 18 | 23 | 48 | 37 | |
| 0.15 | 0.4 | Carbohydrazide + Potassium persulfate | 0.3 g + 0.35 g | — | 14 | 14 | 21 | 10 | Note: No azodicarbonamide was used in this experiment |
| 0.15 | 0.4 | Carbohydrazide + Potassium persulfate | 0.3 g + 0.3 g | — | 60 | 64 | 81 | 173 | |
| 0.15 | 0.4 | Magnesium oxide | 0.35 g | — | 23 | 33 | 64 | 70 | |

[1] lauryl sulfate, g.
[2] hydroxysultaine, ml.
[3] activator (amine or inorganic compound)
[4] activator amount
[5] volume in 1 hour and 30 min, ml.
[6] volume in 3 hours, ml.
[7] % gas in fluid after 3 hours.
[8] gas amount, ml/g of azo compound at 140° F.

The results of Example 1 are discussed later with the results of Example 2.

Example 2

The results for diutan solutions are shown in Table 2. In a typical procedure, 0.5% by volume of diutan solution in water was employed. Azodicarbonamide was added with vigorous stirring, which was continued until all the solid was uniformly dispersed and suspended. In a typical experiment, 0.5 g azodicarbonamide was suspended in 10 ml of diutan solution, followed by addition of foaming surfactant (sodium lauryl sulfate, 0.4 ml), and the activator. The gas measurements were made at room temperature. The starting volume of the fluid in each experiment was 12 ml.

TABLE 2

| $A^1$ | $B^2$ | $C^3$ | $D^4$ | $E^5$ | $F^6$ | $G^7$ |
|---|---|---|---|---|---|---|
| DETA | 0.5 ml | n.d., | 20 | 40 ml/26 hrs | 40 | 56 (in 26 hrs) |
| Carbohydrazide | 0.5 g | 17 | 17 | >80 ml | 29 | >136 (in 48 hrs) |
| NaOH (solid) | 0.5 g | 20 | 25 | >80 ml | 52 | >136 (in 48 hrs) |

[1] activator
[2] activator amount
[3] fluid volume in 60 min, ml.
[4] fluid volume is 100 min, ml.
[5] final volume after 48 hours, ml (estimated)
[6] % gas in 100 min
[7] gas amount ml/g of azo compound at room temperature The results of Examples 1 and 2 show that (1) organic amines are effective activators, and generally perform better than inorganic oxides (for example, MgO experiment in Table 1); (2) low pH values, for example, less than pH of 9, can be employed to generate nitrogen gas from the azo compound; and (3) oxidizing agents are optional (not needed) to generate nitrogen gas from the azo compounds.

OTHER EMBODIMENTS

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:

1. A method comprising:
   preparing a gas-generating aqueous composition comprising an azo compound, a viscosifier, and an organic amine, the azo compound comprising the Formula (I):

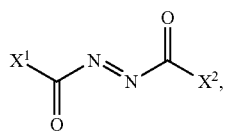

(I)

or a salt thereof, where:
X$^1$ and X$^2$ are each independently selected from the group consisting of C$_{1-6}$ alkyl, C$_{2-6}$ alkenyl, C$_{2-6}$ alkynyl, OR$^{a1}$, and NR$^{c1}$R$^{d1}$; and
each R$^{a1}$, R$^{c1}$, and R$^{d1}$ is independently selected from the group consisting of H, C$_{1-6}$ alkyl, C$_{2-6}$ alkenyl, C$_{2-6}$ alkynyl, C$_{3-7}$ cycloalkyl, and C$_{6-10}$ aryl, wherein the gas-generating composition has a pH of between about 4 and about 9, and wherein the molar ratio between the azo compound and the organic amine is between 1:10 and 1:1;
storing the gas-generating aqueous composition before application;
mixing the gas-generating aqueous composition with a wellbore fluid to form a mixture; and
flowing the mixture of the wellbore fluid with the gas-generating aqueous composition into a subsurface, hydrocarbon-bearing formation to perform a well operation.

2. The method of claim 1, comprising adding to the wellbore fluid a composition comprising an oxidizing compound.

3. The method of claim 2, where the oxidizing compound is selected from: a peroxysulfate, a peroxycarbonate, a peroxyborate, a peroxide, a hypochlorite, and an organic peracid.

4. The method of claim 1, wherein an amount of the azo compound in the gas-generating aqueous composition is in a range from about 1 weight percent (wt. %) to about 10 wt. %.

5. The method of claim 1, wherein the organic amine comprises an ethyleneamine.

6. A method comprising:
   adding an aqueous gas-generating composition comprising an azo compound, a viscosifier, and an organic amine to a wellbore fluid to increase compressibility and affect density of the wellbore fluid as applied downhole in a hydrocarbon-bearing formation, the azo compound comprising the Formula (I):

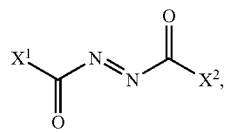

(I)

or a salt thereof, where:
X$^1$ and X$^2$ are each independently selected from the group consisting of C$_{1-6}$ alkyl, C$_{2-6}$ alkenyl, C$_{2-6}$ alkynyl, OR$^{a1}$, and NR$^{c1}$R$^{d1}$; and
each R$^{a1}$, R$^{c1}$, and R$^{d1}$ is independently selected from the group consisting of H, C$_{1-6}$ alkyl, C$_{2-6}$ alkenyl, C$_{2-6}$ alkynyl, C$_{3-7}$ cycloalkyl, and C$_{6-10}$ aryl, wherein the gas-generating composition has an acid added to adjust a pH to between about 4 and about 9, and wherein the molar ratio between the azo compound and the organic amine is between 1:10 and 1:1; and
pumping the wellbore fluid having the gas-generating composition into a wellbore in the hydrocarbon-bearing formation.

7. The method of claim 6, comprising preparing the gas-generating composition comprising mixing the azo compound with the organic amine, wherein the gas-generating composition is an aqueous composition, and wherein the wellbore fluid is a wellbore treatment fluid.

8. The method of claim 6, comprising storing the gas-generating composition, wherein the wellbore fluid comprises a drilling fluid or a cement slurry.

9. The method of claim 6, wherein adding the gas-generating composition comprises mixing the gas-generating composition with the wellbore fluid before pumping the wellbore fluid into the wellbore.

10. The method of claim 6, wherein adding the gas-generating composition comprises injecting the gas-generating composition into the wellbore fluid as the wellbore fluid is being pumped into the wellbore.

11. The method of claim 6, comprising activating the azo compound in the wellbore to generate nitrogen gas to increase the compressibility of the wellbore fluid, wherein the organic amine comprises hydrazine or a hydrazide.

12. The method of claim 6, wherein a molar ratio of the organic amine to the azo compound in the gas-generating composition is in a range of 3:1 to 1:1.

13. The method of claim 6, wherein a volume ratio of the gas-generating composition to the wellbore fluid is in a range of about 5:1 to about 1:5.

14. The method of claim 6, wherein an amount of the azo compound in the wellbore fluid is in a range of about 0.2 weight percent (wt. %) to about 8 wt. %.

15. A method comprising:
preparing a gas-generating composition at a production facility comprising an azo compound, a viscosifier, and an organic amine, wherein the gas-generating composition comprises a pH of between about 4 and about 9, and wherein the molar ratio between the azo compound and the organic amine is between 1:10 and 1:1;
transporting the gas-generating composition to a wellbore site;
pumping a wellbore treatment fluid into a wellbore in a hydrocarbon-bearing formation; and
adding the gas-generating composition to the wellbore treatment fluid as the wellbore treatment fluid is being pumped into the wellbore, wherein the gas-generating composition produces nitrogen gas in the wellbore treatment fluid as the wellbore treatment fluid is applied downhole in the hydrocarbon-bearing formation.

16. The method of claim 15, wherein preparing the gas-generating composition comprising mixing the azo compound with the organic amine, wherein the gas-generating composition is an aqueous composition, wherein the azo compound comprises azodicarbonamide, and wherein the organic amine comprises hydrazine or a hydrazide.

17. The method of claim 15, wherein the wellbore treatment fluid comprises a drilling fluid or a cement slurry, and wherein the organic amine comprises an ethyleneamine.

18. The method of claim 15, comprising modulating density of the wellbore treatment fluid in the wellbore via the adding of the gas-generating composition, wherein a molar ratio of the organic amine to the azo compound in the gas-generating composition is in a range of 3:1 to 1:1.

* * * * *